(12) United States Patent
Kwon et al.

(10) Patent No.: US 9,661,230 B2
(45) Date of Patent: May 23, 2017

(54) IMAGE DISPLAY APPARATUS AND METHOD OF OPERATING THE IMAGE DISPLAY APPARATUS

(71) Applicant: LG ELECTRONICS INC., Seoul (KR)

(72) Inventors: Kwanghun Kwon, Seoul (KR); Jinho Hyun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 302 days.

(21) Appl. No.: 14/245,708

(22) Filed: Apr. 4, 2014

(65) Prior Publication Data

US 2015/0009334 A1    Jan. 8, 2015

(30) Foreign Application Priority Data

Jul. 5, 2013  (KR) .................. 10-2013-0079176
Jul. 29, 2013 (KR) .................. 10-2013-0089773

(51) Int. Cl.
*H04N 5/232* (2006.01)
*G06F 3/01* (2006.01)
*H04N 5/33* (2006.01)

(52) U.S. Cl.
CPC .......... *H04N 5/23293* (2013.01); *G06F 3/013* (2013.01); *H04N 5/332* (2013.01)

(58) Field of Classification Search
CPC .................. H04N 5/23293; G06K 9/00604
See application file for complete search history.

(56) References Cited

U.S. PATENT DOCUMENTS

| | | | |
|---|---|---|---|
| 2006/0171704 A1* | 8/2006 | Bingle | B60R 11/04 396/419 |
| 2007/0057764 A1* | 3/2007 | Sato | G06K 9/00006 340/5.52 |
| 2011/0267374 A1* | 11/2011 | Sakata | G06F 3/013 345/672 |

* cited by examiner

*Primary Examiner* — Zhubing Ren
(74) *Attorney, Agent, or Firm* — Birch, Stewart, Kolasch & Birch, LLP

(57) ABSTRACT

Discussed is an image display apparatus including a main body; a display unit displaying at least one screen image; a capturing unit mounted on the main body and capturing an image using a single image sensor; a drive unit that receives a control signal for selectively activating any one of first and second modes that differ depending on whether or not to use an infrared light-cut filter, to drive the capturing unit; and a controller that outputs a first control signal for establishing a connection between the single image sensor and the infrared light-cut filter when one screen image for capturing an image corresponding to a first function is displayed and that outputs a second control signal for establishing a connection between the single image sensor and a visible light-cut filter when another screen image for capturing an image corresponding to a second function is displayed.

8 Claims, 20 Drawing Sheets

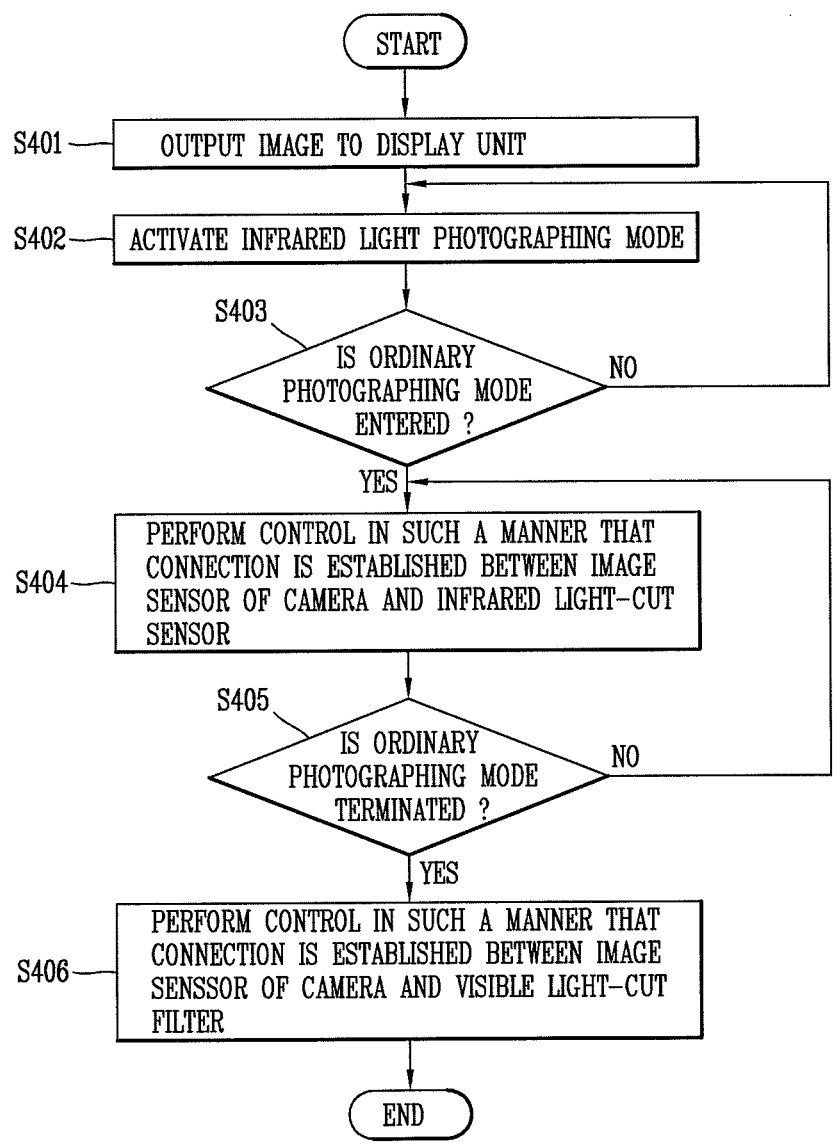

IMAGE DISPLAY APPARATUS AND METHOD OF OPERATING THE IMAGE DISPLAY APPARATUS

CROSS-REFERENCE TO RELATED APPLICATION

Pursuant to 35 U.S.C. §119(a), this application claims the benefit of earlier filing date and right of priority to Korean Application Nos. 10-2013-0079176 and 10-2013-0089773, filed on Jul. 5, 2013 and Jul. 29, 2013, respectively, the contents of which are incorporated by reference herein in their entirety.

BACKGROUND OF THE INVENTION

1. Field of the Invention

The present disclosure relates to an image display apparatus and a method of displaying the image display apparatus, and particularly, to an image display apparatus of which a main body is equipped with a camera and a method of operating the image display apparatus.

2. Description of the Related Art

An image display apparatuses include an apparatus that receives and display broadcasting signals or records and reproduces a moving image and an apparatus that records and reproduces audio data. The image display apparatus is realized, for example, in the form of a television set, a monitor for a computer, a projector, a tablet PC, a navigation apparatus, a digital television set or the like.

The image display apparatus increasingly has multiple functions. In the recent years, the image display device has been realized in the form of a multimedia player equipped with multiple functions including photographing, shooting of video, and gaming, in addition to basic functions of receiving broadcast and playing audio and video files. More recently, the image display apparatus has been realized as a smart device (for example, a smart television). Accordingly, the image display apparatus not only has access to the Internet, but operates also in connection with a mobile terminal and a computer. In addition, the image display apparatus receives digital broadcasting signals and serves as a server in a home network environment or in a ubiquitous environment.

In addition, continuing diversification of the function of the image display apparatus enables the image display apparatus to be equipped with a video telephone call function of transmitting video and audio data between a sender and a receiver and thus conducting a video conversation. Furthermore, the image display apparatus is enabled to be equipped with a user tracking function of detecting a change in a gaze of a user who views an image through a camera equipped with the image display apparatus.

On the other hand, it is desirable that an infrared light camera, which is different from an ordinary camera for use in the video telephone call function, be used in order to increase precision of the user tracking function.

If the image display apparatus is accordingly equipped with both the video telephone call function and the user tracking function, this requires the camera suitable for each function, thereby causing inconvenience. In addition, in such a case, many infrared LEDs are generally used to cover a viewing angle of the camera for the user tracking function, in which case all the infrared LEDs always emit light regardless of where the user is positioned within the viewing angle of the camera. Because of this, while the user tracking function is performed, power consumption due to the emitting of light by many of the infrared LEDs is increased.

SUMMARY OF THE INVENTION

Therefore, an aspect of the detailed description is to provide an image display apparatus that, if a video telephone call function or a user tracking function is performed, is capable of capturing an image suitable for each function using a single camera, particularly, one image sensor, and a method of operating the image display apparatus.

Another aspect of the detailed description is to provide an image display apparatus that is provided with as many infrared LEDs as necessary for covering a viewing angle of a camera capable of performing a user tracking function and that enables as many of the infrared LEDs as necessary, among the infrared LEDs provided, to emit light according to a position of a user who is present within a viewing angle when performing the user tracking function, and a method of operating the image display apparatus.

To achieve these and other advantages and in accordance with the purpose of this specification, as embodied and broadly described herein, there is provided an image display apparatus including: a main body; a display unit that is formed in such a manner that at least one screen image is displayed; a capturing unit mounted on the main body and capturing at least one image using a single image sensor; a drive unit that receives a control signal for selectively activating any one of a first mode and a second mode that differ depending on whether or not to use an infrared light-cut filter, in order to drive the capturing unit; and a controller that outputs a first control signal for establishing a connection between the single image sensor and the infrared light-cut filter when one screen image for capturing an image corresponding to a first function is displayed on the display unit and that outputs a second control signal for establishing a connection between the single image sensor and a visible light-cut filter when another screen image for capturing an image corresponding to a second function is displayed on the display unit.

In the image display apparatus, the first function may be a function for an ordinary photographing or a video telephone call, and the second function may be an infrared light photographing function for obtaining information on a user's gaze.

In the image display apparatus, the controller may control the display unit to output at least one indicator which corresponds to each of control signals that are output according to a change from the first function to the second function and a change from the second function to the first function, respectively.

In the image display apparatus, when the first control signal is received, the drive unit may drive the capturing unit so that the infrared light-cut filter is slid to be positioned in front of the single image sensor, and when the second control signal is received, the drive unit may drive the capturing unit so that the visible light-cut filter is slid to be positioned in front of the single image sensor.

The image display apparatus may further include at least one switch that performs an on/off operation on the infrared light-cut filter and the visible light-cut filter according to the control signal, in which the drive unit may operate a switching element provided in the switch according to the control signal that is received, in order to selectively perform any one of the first function and the second function.

In the image display apparatus, the capturing unit may be formed in such a manner as to detect ambient intensity of illumination, and when it is determined that the ambient intensity of illumination detected through the capturing unit is low intensity of illumination in a state where the one screen image for capturing the image corresponding to the first function is output to the display unit, the controller may output the second control signal to the drive unit.

In the image display apparatus, when it is determined that a user's position is out of a predetermined range from the display unit for a predetermined time in a state where the another screen image for capturing the image corresponding to the second function is output to the display unit, the controller may output the first control signal to the drive unit.

In the image display apparatus, the display unit may include a first region and a second region that is distinguished from the first region, and the controller may perform control in such a manner that the one screen image for capturing the image corresponding to the first function is output to the first region and the another screen image for capturing the image corresponding to the second function is output to the second region.

In the image display apparatus, when a user's gaze detected through the capturing unit is fixed on the first region, the controller may perform the control in such a manner that the first control signal is output to the drive unit, and when the user's gaze detected through the capturing unit is fixed on the second region, the controller may perform the control in such a manner that the second control signal is output to the drive unit.

In the image display apparatus, the infrared light-cut filter and the visible light-cut filter may be arranged to be sideways together in one direction and away from the single image sensor or may be arranged to be sideways in opposite directions, respectively, and away from the single image sensor, and the drive unit may drive a photographing in such a manner that one, which corresponds to the received control signal, of the infrared light-cut filter and the visible light-cut filter, is connected to be positioned in front of the single image sensor.

The image display apparatus may further include a bezel portion that is formed along a front side edge of the display unit, in which the capturing unit that captures an image of a user using at least the single image sensor may be mounted on the bezel portion, and multiple infrared light emitting elements that are arranged to be spaced a predetermined distance relative to one another and away from the capturing unit may be built into the bezel portion, and when an infrared light photographing mode is activated, the controller may drive the capturing unit and may control operation of each of the multiple infrared light emitting elements, based on a third control signal.

In the image display apparatus, when the infrared light photographing mode is activated, the controller may detect a position of a user who is present within a predetermined range from the display unit and may output a control signal for selectively operating the multiple infrared light emitting elements that are arranged in the bezel portion, based on the detected position of the user.

In the image display apparatus, a photographing area for the capturing unit may be divided into multiple areas, and when the infrared photographing mode is entered, the controller may detect the photographing area corresponding to the detected position of the user and may output the control signal for selectively operating at least one infrared light emitting element of which a light emitting range has an effect on the detected photographing area.

In the image display apparatus, when the infrared photographing mode is activated, the controller may output the control signal for causing only the infrared light emitting element corresponding to the detected position of the user to emit light.

In the image display apparatus, when the detected photographing area is changed from a first area to a second area, the controller may perform control in such a manner that a screen image corresponding to the changed photographing area is displayed on one region of the display unit.

In the image display apparatus, based on a user input, the controller may perform control in such a manner that an indicator that visually indicates a position of the infrared light emitting element in operation, among the multiple infrared light emitting elements, is displayed on one region of the display unit.

In the image display apparatus, based on driving of the capturing unit and an operation of each of the multiple infrared light emitting elements, the controller may recognize movements of left and right eyes of a user who is present within a predetermined range from the display unit, and may select a specific object on the screen image that is output, based on the recognized movements of the left and right eyes.

The image display apparatus may further include a sensing unit that detects a state of ambient intensity of illumination, in which the controller may perform control in such a manner that the multiple infrared light emitting elements emit light in different patterns according to the detected state of intensity of illumination.

In the image display apparatus, first multiple infrared light emitting elements adjacent to the capturing unit and second multiple infrared light emitting elements that are arranged to be spaced away from the capturing unit may be built into the bezel portion, and when the detected state of intensity of illumination is a state of high intensity of illumination or an ordinary state, the controller may cause the second multiple infrared light emitting elements to emit light according to a position of a user that is detected, and when the detected state of intensity of illumination is a state of low intensity of illumination, the controller may cause the first multiple infrared light to emit light according to the detected position of the user.

In the image display apparatus, the number of multiple infrared light emitting elements that are built into the bezel portion may be determined in proportion to a size of the display unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings:

FIG. 4 is a flow chart for describing a method of operating an image display apparatus according to one embodiment of the present invention;

DETAILED DESCRIPTION OF THE EMBODIMENTS

Figure 1:
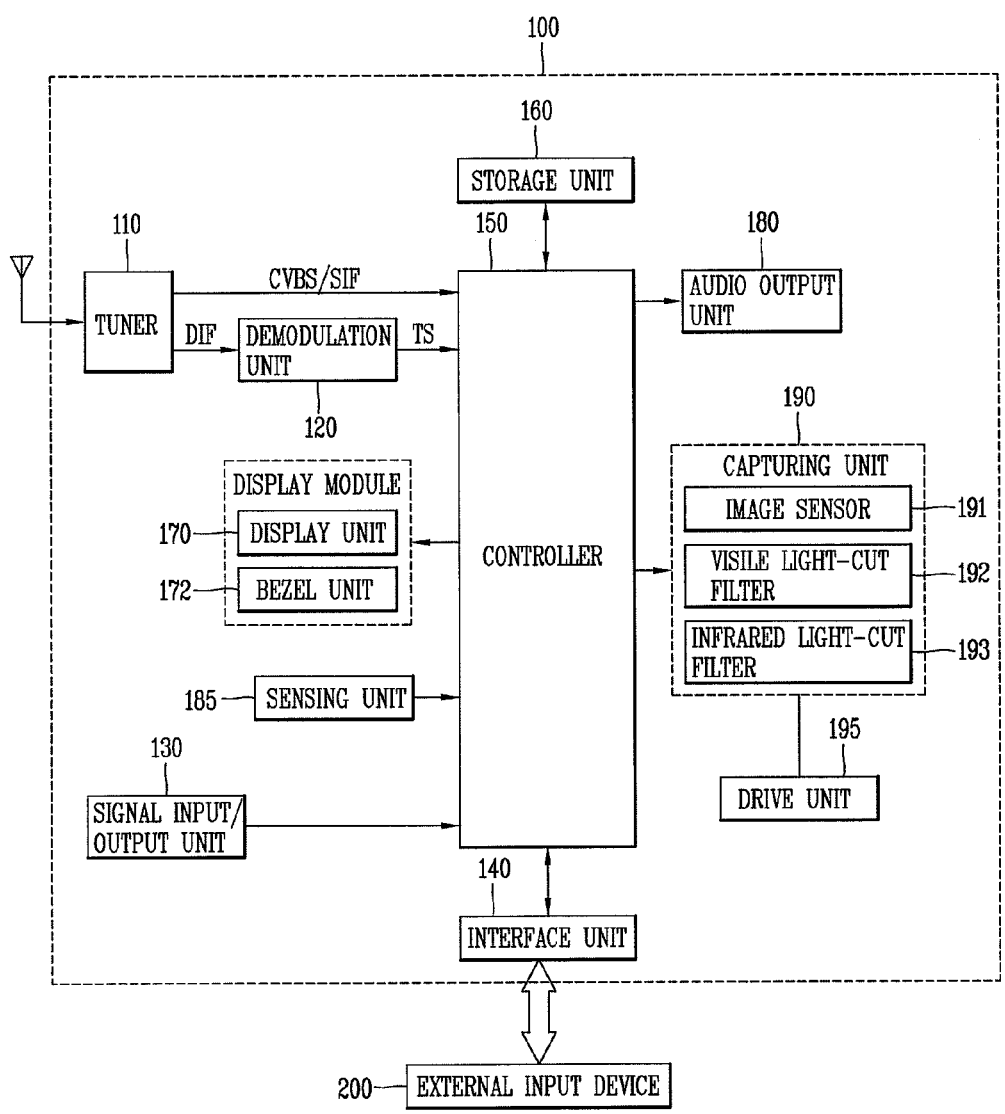
FIG. 1 is a block diagram illustrating a detailed configuration of an image display apparatus according to the present invention.

Referring to the accompanying drawings, embodiments according to the present invention are described in detail below in order to provide all information necessary to teach one of ordinary skill in the art to practice the present invention. However, the present invention is not limited to the embodiments described here, but can be realized also as modifications, alterations, or even improvements. What is considered not to be related to the description of the embodiments is not illustrated in the drawing, and similar constituent parts are provided with similar reference numerals throughout the specification for the purpose of providing the clear description.

An image display device referred to in the present specification includes an apparatus that receives and displays radio broadcasts, an apparatus that records and reproduces a moving image, an apparatus that records and reproduces audio signals.

FIG. 1 is a block diagram illustrating an image display device 100 according to the present invention and an external input device 200. The image display device 100 includes a tuner 110, a demodulation unit 120, a signal input and an output unit 130, an interface unit 140, a controller 150, a storage unit 160, a display unit 170 and an audio output unit 180.

Referring to FIG. 1, the tuner 110 selects a broadcast signal corresponding to a channel selected by the user, from radio frequency (RF) broadcast signals received through an antenna, and converts the selected broadcast signal into an intermediate frequency signal or a baseband video and voice signal. For example, if the RF broadcast signal is a digital broadcast signal, the tuner 110 converts the RF broadcast signal into a digital IF signal DIF. In contrast, if the RF broadcast signal is an analog broadcast signal, the tuner 110 converts the RF broadcast signal into a baseband video and voice signal CVBS/SIF. In this manner, the tuner 110 is a hybrid tuner that processes the digital broadcast signal and the analog broadcast signal.

A digital IF signal DIF, output from the tuner 110, is input into the demodulation unit 120, and an analog baseband video and voice signal CVBS/SIF, output from the tuner 110, is input into the controller 150.

The tuner 110 receives a single carrier RF broadcast signal according to the Advanced Television Systems Committee (ATSC) standards or a multiple-carrier RF broadcast signal according to the Digital Video Broadcasting (DVB) standards.

Although one tuner 110 is illustrated in the drawings, the image display device 100 is not limited to the one tuner and may include the multiple tuners, for example, first and second tuners. In this case, the first tuner receives a first RF broadcast signal corresponding to the broadcast channel selected by the user, and the second tuner receives a second RF broadcast signal corresponding to the already-stored broadcast channel, sequentially or periodically. The second tuner converts the RF broadcast signal into the digital IF signal DIF, or the analog baseband video and voice signal CVBS/SIF, in the same manner as the first tuner.

The demodulation unit 120 receives the digital IF signal DIF that results from the conversion and performs a demodulation operation.

If the digital IF signal DIF, output from the tuner 110, is in the ATSC format, the demodulation unit 120 performs 8-vestigial side band (8-VSB) modulation. The 8-vestigal side band (8-VSB) demodulation results from vestigial side band modulation, which is single carrier amplitude modulation using the National Television System Committee (NTSC) frequency bandwidth. At this time, the demodulation unit 120 performs channel decoding, such as Trellis decoding, de-interleaving, and Reed-Solomon decoding. To that end, the demodulation unit 120 includes a Trellis decoder, a de-interleaver, a Reed-Solomon decoder, and the like.

When the digital IF signal DIF, output from the tuner 110, is in the DVB format, the demodulation unit 120 performs Coded Orthogonal Frequency Division Modulation (COFDMA) modulation. At this time, the demodulation unit 120 performs channel decoding, such as convolution decoding, the de-interleaving, and the Reed-Solomon decoding. To do this, the demodulation unit 120 includes a convolution decoder, the de-interleaver, and the Reed-Solomon decoder.

In this manner, the demodulation unit 120 outputs a stream signal TS after performing the demodulation and the channel decoding. At this time, the stream signal results from multiplexing a video signal, a voice signal, or a data signal. For example, the stream signal TS is an MPEG-2 Transport Stream (TS) that results from multiplexing an MPEG-2 standard video signal, a Dolby AC-3 standard voice signal, and the like. Here, the MPEG-2 TS includes a 4 byte header and a 184 byte payload.

In this manner, the signal, output from the demodulation unit 120 is input into the controller 170 and goes through inverse multiplexing and video/voice signal processing.

The signal input and output unit 130 is by a cable or wirelessly connected to an external apparatus, for example, a digital versatile disk (DVD) player, a Blu-ray disk player, a game apparatus, a camera, a videotape recorder, a notebook computer, a set-top box, a portable device, a smart phone and the like, and performs signal input and output operations. To do this, the signal input and output unit 130 includes an A/V input and output unit for connection to a cable network and a wireless communication unit for connection to a wireless network.

The A/V input and output unit includes an Ethernet port, a USB port, a Composite Video Banking Sync (CVBS) port, a composite port, an S-video port (analog), a Digital Visual Interface (DVI) port, a High Definition Multimedia Interface (HDMI) port, a Mobile High-definition Link (MHL) port, a RGB port, a D-SUB port, an IEEE 1394 port, a SPDIF port, a Liquid HD port, and the like. A digital signal, input through these, is transferred to the controller 150. At this time, an analog signal, input through the CVBS port and the S-VIDEO port, is converted into the digital signal by an analog-to-digital converter (not illustrated) and is transferred to the controller 150.

The wireless communication unit performs wireless Internet access. The wireless communication unit performs wireless Internet access by using wireless communication technologies, such as Wireless LAN (WLAN) (Wi-Fi), Wireless Broadband (Wibro), World Interoperability for Microwave Access (Wimax), and High Speed Downlink Packet Access (HSPPA). In addition, the wireless communication unit can perform short-range communication with a different electronic apparatus. For example, the wireless communication unit performs the short-range communication by using a short-range communication technology, such as Bluetooth, Radio Frequency Identification (RFID), Infrared Data Association (IrDA), Ultra Wideband (UWB), or ZigBee.

The signal input and output unit 130 connects to a predetermined web page over the wireless and cable networks and thus transmits the data to and from the server and additionally receives content or various items of data, for example, the content, such as movies, an advertisement, a game, VOD, and broadcast signals and various items of content-related information, which are provided by a content service provider or a network administer. The signal input and output unit 130 receives firmware update information and update files provided by the network administrator over the cable and wireless networks and receives an application selected by the user among applications that are placed in a public domain.

The signal input and output unit 130 transfers an image signal, a voice signal, and the data signal that are provided by the external apparatus, to the controller 150. In addition, the signal input and output unit 130 transfers the image signal, the voice signal, and the data signal included in various media files stored in an external storage device, such as a memory device and a hard disk driver, to the controller 150. In addition, the signal input and output unit 130 transfers the image signal, the voice signal, and the data signal that are processed by the controller 150, to the external apparatus described above, or the different external apparatus.

For example, the signal input and output unit 130 is connected to the set-top box, for example, a set-top box for Internet Protocol TV (IPTV), through at least one of the ports described above, and performs the signal input and output operation. In addition, the signal input and output unit 130 transfers the image signal, the voice signal, and the data signal, which are processed by the set-up box for the IPTV in such a manner the image signal, the voice signal, and the data signal are available for bidirectional communication, to the controller 150, and transfers the signals processed by the controller 150 back to the set-up box for the IPTV. The IPTV here includes ADSL-TV, VDSL-TV, and FTTH-TV that are different depending on a transmission network. The IPTV includes TV over DSL, Video over DSL, TV over IP (TVIP), Broadband TV (BTV) and the like. In addition, the IPTV includes Internet TV and full browsing TV in which Internet connection is possible.

The digital signal, output from the signal input and output unit 130, also includes the stream signal TS. The stream signal TS, described above, is a signal that results from multiplexing the image signal, the voice signal, and the data signal.

The interface unit 140 transfers the signal, input by the user, to the controller 150, or transfers the signal transferred from the controller 150, to the user.

The interface unit 140 transfers a user input signal, input into a power key, a channel key, a volume key, a setting key and the like, to the controller 150. In addition, the interface unit 140 includes a sensing unit (not illustrated) for sensing a user gesture, a user location, a touch, and the like. To that end, the sensing unit includes a touch sensor, a voice sensor, a location sensor, a motion sensor, a gyro sensor, and the like. In such a case, the interface unit 140 transfers an input signal, input from the sensing unit, to the controller 150, or transmits the signal coming from the controller 150 to the sensing unit.

The interface unit 140 receives an input signal that the user inputs with the external input device 200, for example, the spatial remote controller, to perform power source control, channel selection, screen setting and the like, or transmits the signal processed by the controller 160 to the external input device 200. At this time, the interface unit 140 and the external input device 200 are connected to each other, by a cable or wirelessly.

In addition, the interface unit 140 receives personal information from the external input device 200 and/or receives information on a web server in connection by using the personal information. For example, if the mobile terminal approaches the external input device 200 within a predetermined distance and performs near field communication (NFC), the external input device 200 receives the personal information and others stored in the mobile terminal. The personal information here is information that is necessary to log on with a predetermined account before making a connection to the electronic apparatus or using the service.

The controller 150 controls general operation of the image display device 100. Specifically, the controller 150 generates or outputs a signal for the image or voice output by inversely multiplexing the stream signal TS that is received through the tuner 110, the demodulation unit 120, and/or the signal input and output unit 130 or by processing the inversely-multiplexed signals. For example, the controller 150 controls the tuner 110 in such a manner that the RF broadcast signal corresponding to the channel selected by the user or the already-stored channel is tuned.

The image signal image-processed by the controller 150 is transferred to the display unit 170 and an image corresponding to a resolution image signal is output. The voice signal processed by the controller 150 is transferred to the audio output unit 180 to output a sound. In addition, the image signal and/or the voice signal, which is processed by the controller 150, is input into an output device of the external apparatus through the signal input and output unit 130.

Although not illustrated in the drawings, the controller 150 includes, for example, an inverse multiplexing unit, an image processing unit, an On Screen Display (OSD) generation unit and a voice processing unit, a data processing unit, a channel browsing processing unit and others in order to generate or output the signal for the image or sound output by inversely multiplexing the stream signal TS or by processing the inversely-multiplexed signals.

The inverse multiplexing unit (not illustrated) inversely multiplexes the stream signal TS that is input. For example, if the MPEG-2 stream signal TS is input, the inverse multiplexing unit inversely multiplexes the MPEG-2 stream signal TS into the image signal, the voice signal, and the data signal. The stream signal TS here, as described above, is an output from the tuner 110, the demodulation unit 120, and/or the signal input and output unit 130.

The imaging processing unit (not illustrated) performs image processing, for example, decoding, on the inversely-multiplexed image signal. More specifically, the image processing unit decodes an MPEG-2 standard-encoded image signal by using an MPEG-2 decoder, and decodes an H.264 standard-encoded image signal according to Digital Multimedia Broadcasting (DMB) standard or Digital Video Broadcast-Handheld (DVB-H) standards by using an H.264 decoder. In addition, the image processing unit performs the imaging processing in such a manner that brightness, tint and color of the image signal are adjusted. In addition, the image processing unit performs scaling in such a manner that the inversely-multiplexed image signal can be output on the display unit 170. In this manner, the image signal, which is image-processed by the image processing unit, is transferred to the display unit 170 or transferred to an external output apparatus (not illustrated) through an external output port.

The OSD generation unit (not illustrated) generates an OSD signal depending on a user input or by itself. More specifically, the OSD generation unit generates a signal for displaying various items of information in the form of a graphic or a text on the screen of the display unit 170, for example, based on at least one of the image signal and the data signal or an input signal that is received from the external input device 200. The generated OSD signal includes various data, such as a user interface, various menu screens, a widget, and an icon that are provided on the image display device 100 and a pointer corresponding to a pointing signal that is transmitted from the external input device 200. In addition, the generated OSD signal includes a 2D object or a 3D object.

The controller 150 mixes the OSD signal that is generated by the OSD generation unit described above and the image signal that is image-processed and decoded by the image processing unit. The mixed image signal goes through a frame rate converter (FRC) to change its image frame rate. In addition, the mixed image signal goes through a formatter and is output with its image signal format being changed, or is separated into a 2D image signal and a 3D image signal for 3D image display or is converted from the 2D image signal into the 3D image signal.

The voice processing unit (not illustrated) performs, voice processing, for example, decoding, on the inversely multiplexed voice signal. More specifically, the voice processing unit decodes the MPEG-2 standard-encoded voice signal by using the MPEG-2 decoder, decodes an MPEG 4 Bit Sliced Arithmetic Coding (BSAC) standard-encoded voice signal according to the DMB standards by using an MPEG 4 decoder, and decodes an MPEG 2 advanced audio coded (AAC) standard-encoded voice signal according to satellite DMB standards or the Digital Video Broadcast-Handheld (DVB-H) standards by using an AAC decoder. In addition, the voice processing unit performs base processing, treble processing, and sound volume processing. The voice signal that is processed by the voice processing unit in this manner is transferred to the audio output unit 180, for example, a speaker, or is transferred to an external out device.

The data processing unit (not illustrated) performs data processing, for example, decoding, on the inversely multiplexed voice signal. The data signal here includes electronic program guide (EPG) information including broadcast information, such as a broadcasting-starting time and a broadcasting-ending time of a broadcast program that is broadcast over each channel. The EPG information includes, for example, ATSC-program and System Information Protocol (ATSC-PSIP) in the case of ATSC standards and includes DVB-Service Information (DVB-SI) in the case of DVB. The ATSC-PSIP or the DVB-SI here is included in a header (4 byte) of the MPEG-2 stream signal TS.

The channel browsing processing unit (not illustrated) receives the stream signal TS, output from the demodulation unit 120, or the stream signal, output from the signal input and output TS unit 130, as an input, and extracts an image from it, thereby generating a thumbnail image. The generated thumbnail image, as it is, or as is encoded, is input into the controller 150. In such a case, the controller 150 displays a thumbnail list including the multiple thumbnail images on the display unit 170 by using the thumbnail image that is input. At this time, the thumbnail images in the thumbnail list are displayed on all the regions of the display unit 170, or are displayed one region of the display unit 270 in a manner that enables the thumbnail images to be easily viewable. In addition, the thumbnail images in the thumbnail list are sequentially updated.

On the other hand, the controller 150 performs signal processing on the analog baseband image/voice CVBS/SIF as well. For example, the analog baseband image and voice signal CVBS/SIF, input into the controller 150, is the analog baseband image and voice signal, output from the tuner 110 or the signal input and output unit 130. The controller 150 performs the control, in such a manner that the analog baseband image and voice signal CVBS/SIF that is input is processed, the signal-processed image signal is displayed on the display unit 170, and the signal-processed voice signal is output to the audio output unit 180.

In addition, the controller 150 controls operation of the image display device 100 with a user command, input through the signal input and output unit 130 or the interface unit 140, or with an internal program. More specifically, the controller 150 determines whether or not the external apparatus is connected, depending on the input of the personal information from the external input device 200, based on information on the adjacent external apparatus around the image display device 100, which is received from the signal input and an output unit 130 or the interface unit 140, and based on information on a channel over, a frequency at, and a code through which the different external apparatus can be remotely controlled, Then, the controller 250 displays an object indicating the external apparatus being connected, on the display unit 170.

In addition, the controller 150 displays at least one object that is to be displayed on the display unit 170, as a 3D object. For example, in addition to a Web screen (a newspaper, a magazine, and the like) in connection and an electronic program guide (EPG), the object here includes at least one of a menu of various items, a widget, an icon, a still image, a moving image, and a text.

In addition, the controller 150 detects a user gesture by analyzing individually or combinedly an image that is captured by an imaging device (not illustrated), a signal that is detected by a sensing unit (not illustrated), and an input signal that is transmitted by the external input device 200.

In addition, the controller 150 identifies a location of the user, based on the images captured by the capturing unit (not illustrated). For example, the controller 250 measures a distance (an X-axis coordinate) between the user and the image display device 100, and additionally measures an X-axis coordinate and a Y-axis coordinate within the display unit 170, which correspond to the location of the user.

The storage unit 160 stores a program for the signal processing and the control by the controller 150, and stores information on a predetermined broadcast channel through the use of the signal-processed image signal, the voice signal and the data signal, and a channel memory function such as generating a channel map writing. The storage unit 160 includes at least one of the following storage media: a flash memory, a hard disk, a multimedia card micro type, a card type memory (for example, an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

In addition, the storage unit 160 stores IR format key codes for controlling different external apparatuses, and stores IR format key database for multiple external apparatuses.

The image signal, the data signal, and the OSD signal that are processed by the controller 150, or the image signal, the data signal, and a control signal and others that are received from the signal input and output unit 130 or the interface unit 140 are converted into a RGB signal, and a drive signal is generated. Through this process, the resulting image is output to the display unit 170. The display unit 170 is realized in various forms as follows: a plasma display panel (PDP), a liquid crystal display (LCD), a thin film transistor-liquid crystal display (TFT-LCD), an organic light emitting diode (OLED), a flexible display, a 3D display, and an e-ink display.

For example, if the display unit 170 is a 3D display, this is realized as an add-on display type or as a sole display type that enables 3D image viewing. The sole display type is for the display unit 170 to solely realize a 3D image without a separate display, for example, without using eyeglasses. For example, the sole display type is categorized into a lenticular type and a parallax barrier type. In addition, the add-on display type is for the display unit 170 to realize the 3D image by using a 3D viewing device. For example, the add-on display type is categorized into a head-mounted display (HMD) type and an eyeglasses type.

In addition, if the display unit 170 is realized as being equipped with a touch screen-equipped touch screen, the display unit 170 functions as the input device as well as the output device.

The touch sensor is configured in such a manner as to convert a pressure applied to a specific portion of the display unit 170, a change in electrostatic capacitance occurring in a specific portion of the display unit 170, or the like into an electrical signal. The touch sensor is configured in such a manner as to detect the pressure that is applied to the touch sensor at the time of the touch, as well as a position and an area of the touch sensor that a touching object touches on. The touching object here is an object that applies the touch to the touch sensor, and includes for example, a finger, a touch pen or a stylus, a pointer and the like. If the touch input is applied to the touch sensor, a signal(s) corresponding to the touch input is sent to a touch controller. After processing the signal(s), the touch controller transmits the corresponding data to the controller 150. Accordingly, the controller 150 identifies which region of the display unit 170 is touched on.

The audio output unit 180 receives the voice signal processed by the controller 150, for example, a stereo signal or a 5.1 channel signal, as an input, and outputs a sound corresponding to the processed voice signal. To do this, the audio output unit 180 is realized as various types of speakers.

The image display device 100 includes a capturing unit 190 (which can be referred to as a 'camera') for capturing a peripheral image to receive an audio signal and a video signal, and for transmitting the received signal to an external device or tracing a user based on the received signal. The capturing unit 190 includes an image sensor 191, a visible ray shielding filter 192, and an infrared ray shielding filter 193. The capturing unit 190 may further include a microphone (not shown).

The capturing unit 190 may be configured to capture a user, and information on an image captured by the capturing unit 190 may be input to the controller 150. The controller 150 may detect an image, a position, a gesture, an eye change, etc. of a user, based on the captured image. Further, the capturing unit 190 may perform a user's tracking function and a general capturing function using a single camera.

The microphone (not shown) may receive a voice command from a user. The microphone (not shown) may include various types of noise removing algorithms to remove noise generated in the course of receiving an external audio signal.

In addition, the image display device 100 includes an image communication unit (not illustrated) that is configured to include the microphone (not illustrated) and the capturing unit 190. The controller 150 signal-processes the information on the image captured by the capturing unit and information collected by the microphone and transmits the result of the signal processing to an image communication apparatus of the other party through the signal input and output unit 130 or the interface unit 140.

In addition, the image display device 100 may include a user tracking unit (not shown) that is configured to include the microphone (not illustrated) and the capturing unit 190. The controller 150 may recognize a position of a user's eyes based on an image captured by the capturing unit 190, and detect an eye change due to movement of a user's two eyes.

The controller 150 may acquire information on a user's eyes, based on a signal received from a user tracking unit (not shown).

A power supply unit (not illustrated) supplies electric power throughout the image display device 100. Specifically, the power supply unit supplies electric power to the controller 150 realized in the System-On-Chip (SOC) form, the display unit 170 for displaying the image, and the audio output unit 180 for outputting audio.

To do this, the power supply unit (not illustrated) includes a converter (not illustrated) that converts DC power into AC power. On the other hand, for example, if the display unit 170 is realizes as a liquid crystal panel including multiple backlight lamps, the power supply unit further includes an inverter (not illustrated) in which a PWM operation is possible for brightness variability and dimming drive.

The external input device 200 is connected to the interface unit 140 by a cable or wirelessly and transmits the input signal that is generated according to the user input, to the interface unit 140. The external input device 200 includes a remote controller (for example, the spatial remote controller), a mouse, a keyboard, a wheel, and the like. The remote controller transmits the input signal to the interface unit 140 by using the communication technology such as Bluetooth, RF, Infrared Data Association (IrDA), Ultra Wideband (UWB), or ZigBee. If the external input device 200 is realized, specifically, as the spatial remote controller, the external input device 200 generates the input signal by detecting a movement of the main body.

On the other hand, the image display device 100 is realized as a fixed-type digital broadcast receiver or a mobile digital broadcast receiver.

If the image display device 100 is realized as the fixed type digital broadcast receiver, the image display device 100 is realized in such a manner as to receive at least one of the following broadcast types: digital broadcast to which to apply an ATSC type (8-VSB type) that uses a single carrier, digital broadcast to which to apply a ground wave DVB-T type (COFDM type) that uses multiple carriers, and digital broadcast in which to apply an ISDB-T type (BST-OFDM type) digital broadcast that allows for the use of different broadcast channel depending on a user authority.

If the image display device 100 is realized as the mobile digital broadcast receiver, the image display device 100 is realized in such a manner as to receive at least one of the following broadcast types: digital broadcast to which to apply a ground wave DMB type, digital broadcast to which to apply a satellite DMB type, digital broadcast to which to apply an ATSC-M/H type, digital broadcast to which to apply a Digital Video Broadcast-Handheld (DVB-H) type, and digital broadcast to which to apply a Media Forward Link-Only type.

On the other hand, the image display device 100 is realized as the digital broadcast receiver for cable communication, satellite communication or IPTV. In addition, the image display apparatus 100 described above is applied to the mobile terminal as well. The mobile terminal includes a mobile phone, a smart phone, a laptop computer, a digital-broadcast-dedicated terminal, a personal digital assistant (PDA), a portable multimedia player (PMP), a navigation system, a slate PC, a tablet PC, an ultrabook and the like.

The image display device, when used as the mobile terminal, further includes the wireless communication unit in addition to the configuration described above. The wireless communication unit enables wireless communication between the mobile terminal and a wireless communication system or between the mobile terminal and a network within which the mobile terminal is located.

To this end, the wireless communication unit includes at least one of a broadcast receiving module, a mobile communication module, a wireless Internet module, a short-range communication module and a positional information module.

The broadcast receiving module receives a broadcast signal and/or broadcast related information from a broadcast administrative server over a broadcast channel.

The broadcast channel here includes a satellite channel, a ground wave channel and the like. In addition, the broadcast administrative server means a server that generates and transmits the broadcast signal and/or the broadcast-related information or a server that receives the generated broadcast signal and/or the generated broadcast-related information and transmits them to the mobile terminal. The broadcast signal here includes not only a TV broadcast signal, a radio broadcast signal, and a data broadcast signal, but also a broadcast signal in the form of a combination of the TV broadcast signal or the radio broadcast signal and the data signal.

The broadcast-related information means broadcast-channel-related information, a broadcast program or a broadcast service provider. The broadcast-related information is provided over a mobile communication network. In addition, the broadcast-related information comes in various forms. For example, the broadcast-related information comes in the form of an electronic program guide in Digital Multimedia Broadcasting (DMB), or an electronic service guide in Digital Video Broadcast-Handheld (DVB-H).

The broadcast receiving module receives the digital broadcast signal by using the following TV standards: Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management system (MBBMS), and Integrated Services Digital Broadcast-Terrestrial (ISDB-T). Of course, the broadcast receiving module is configured in such a manner that it is suitable not only for a digital broadcasting system described above, but also for other broadcasting systems.

The broadcast signal and/or the broadcast-related information that are received through the broadcast receiving module are stored in the memory.

The mobile communication module transmits a wireless signal to and from at least one of a base station an external terminal, and a server over a mobile communication network. The wireless signal includes a voice call signal, a video telephone call signal or various forms of data involved in the transmitting and receiving of a text/multimedia message.

The mobile communication module is configured to realize a videotelephony mode and a voice telephony mode. The videotelephony mode refers to a mode in which the user is engaged in a voice conversation with real-time viewing of the other party's image being enabled, and the voice telephony mode refers to a mode in which the user is engaged in the voice conversation with the real-time viewing of the other party's image being disabled.

The mobile communication module is configured to transmit and receive at least one of voice and video to realize the videotelephony mode and the voice telephony mode. The wireless Internet module is a module for wireless Internet access and is built into or provided independently of the mobile terminal. To provide the wireless Internet access, Wireless Internet technologies are used such as Wireless LAN (WLAN), Wireless Fidelity (WiFi) Direct, (Digital Living Network Alliance (DLNA), Wireless broadband (Wibro), World Interoperability for Microwave Access (Wimax), High Speed Downlink Packet Access (HSDPA), GSM, CDMA, WCDMA, and Long Term Evolution (LTE).

The short-range communication module refers to a module for short-range communication. To provide the short-range communication, short-range communication network technologies are used such as Bluetooth, Radio Frequency Identification (REID), Infrared Data Association (IrDA), Ultra Wideband (UWB), ZigBee, Near Field Communication (NFC), and WiFi Direct.

The positional information module is a module for obtaining a location of the mobile terminal and its typical example is a Global Position System (GPS) module or a WiFi (Wireless Fidelity (WiFi) module.

Figure 2:
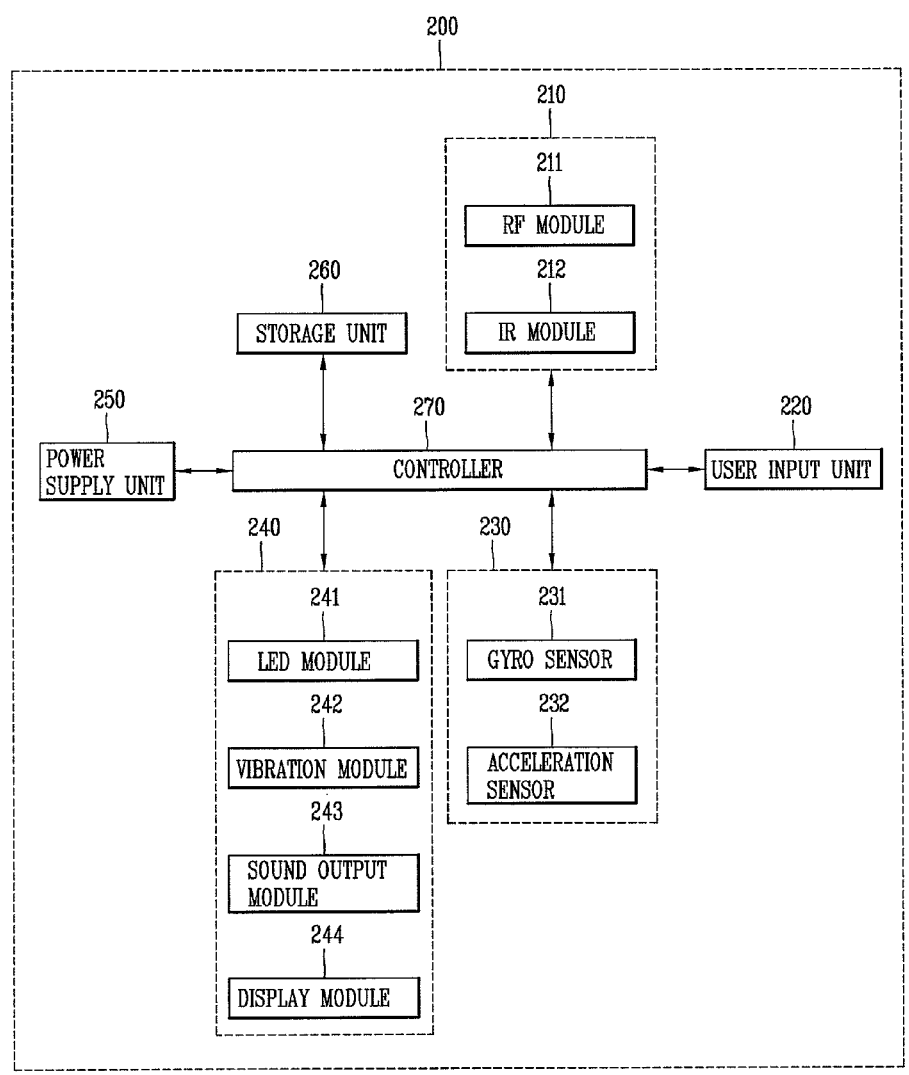
FIG. 2 is a block diagram illustrating an external input device in FIG. 1 in detail.

FIG. 2 is a block diagram illustrating in detail the external input device 200 in FIG. 1. The external input device 200 is configured to include a wireless communication unit 210, a user input unit 220, a sensing unit 230, an output unit 240, a power supply unit 250, a storage unit 260 and a controller 270.

Referring to FIG. 2, the wireless communication unit 210 transmits a signal to and from the image display device 100. To that end, the wireless communication unit 210 includes an RF module 211 and the IR module 212. The RF module 211 transmits the signal transmit to and from the interface unit 140 of the image display device 100 according to RF communication standards. The IR module 212 transmits the signal to and from the interface unit 140 of the image display device 100 according to IR communication standards. For example, the wireless communication unit 210 transmits a signal including information on a movement of the external input device 200 to the image display device 100 through the RF module 211.

On the other hand, the external input device 200 further includes an NFC module (not illustrated) for a short-range magnetic field communication with the predetermined external apparatus. Through the short-range magnetic field communication with the external apparatus, the external input device 200 receives personal information and information on a Web server that is accessed with the personal information and transmits the received information to the image display device 100 through the RF module 211 or the IR module 212.

In addition, the external input device 200 transmits the signal to the interface unit 140 of the image display device 100 by using the communication technology such as Bluetooth, Infrared Data Association (IrDA), Ultra Wideband (UWB), ZigBee), and short-range magnetic field communication (NFC).

The external input device 200 receives the image, the voice, or the data signal that is output from the interface unit 140 of the image display device 100. Then, based on the image, the voice, or the data signal that is received, the external input device 200 displays it on the image display device 100 or outputs it as audio.

In addition, the external input device 200 receives from the adjacent external apparatus information on the different external apparatus and information on the channel over, the frequency at, and the code through which the different external apparatus can be remotely controlled. Based on such information on the different external apparatus, the external input device 200 assigns the channel, the frequency, or the code to the corresponding external apparatus and performs remote control.

The user input unit 220 includes an input unit such as a keypad, a key button, a touch screen, a scroll key, and a jog key. The user operates the user input unit 220 to input a control command associated with the image display device 100. The user inputs such a control command, for example, by pushing down the key button of the user input unit 220. In addition, for example, if the user input unit 220 is equipped with the touch screen, the user inputs the control command by touching on a soft key of the touch screen.

The user input unit 220 includes, for example, an okay key, a menu key, a direction control key, a channel tuning key, a volume adjustment key, a return key, and a home key. The okay key (not illustrated) is used to select a menu or an item. The menu key (not illustrated) is used to display a predetermined menu. The direction control key is used to move a pointer or an indicator displayed on the display unit 170 of the image display device 100, upward, downward, leftward, and rightward. In addition, the channel tuning key (not illustrated) is used to tuning in on a specific channel. The volume adjustment key (not illustrated) is used to adjust the volume in such a manner as to make it be down low or up high. In addition, the return key (not illustrated) is used to move back to the previous screen. The home key (not illustrated) is used to move to a home screen.

The okay key may be configured to additionally have a scrolling function. To that end, the okay key is configured in such a manner as to take the wheel key form. That is, the user can push on the okay key upward and downward or leftward and rightward to select the corresponding menu or item. Also, the user can rotate the wheel forward and backward to scroll through the screen output on the display unit 170 of the image display device 100 or switch it to the next list page. For example, if one region of a screen that has to be output in its entirety is actually output to the display unit 170, the user can scroll the wheel of the okay key to search for a different region of the screen that he/she wants. Thus, a region of the screen that has not been output to the display unit 170 is output to the display unit 170. In another example, if the list page is displayed on the display unit 170, the user can scroll the wheel of the okay key to display the page that precedes or follows the current page currently displayed on the display unit 170.

Channel up or down may be performed in correspondence to a rotation degree of a wheel, using the scroll function of the okay key. Likewise, volume up or down may be performed in correspondence to a rotation degree of a wheel.

In addition, a separate key can be provided to perform the scrolling function that is separated from the okay key.

The sensing unit 230 includes a gyro sensor 231 and an acceleration sensor 232. The gyro sensor 231 senses a spatial movement of the external input device 200 in terms of an X-axis, a Y-axis, and a Z-axis. The acceleration sensor 232 senses a moving speed of the external input device 200.

In addition, the sensing unit 230 further includes a distance measurement sensor to sense a distance from the display unit 170.

The output unit 240 outputs information that depends on operation of the user input unit 220 and information corresponding to a transmission signal of the image display device 100. The user recognizes an operation state of the user input unit 220 or a control state of the image display device 100 through the output unit 240. The output unit 240 includes an LED module 241, a vibration module 242, an audio output module 243, and a display module 244. The LED module 241 emits light, the vibration module 242 generates vibration, an audio output module 243 outputs sound, and a display module 244 displays an image, in response to the operation of the user input unit 220 or a signal transmitted and received through the wireless communication unit 210.

The power supply unit 250 supplies electric power to various electronic elements of the external input device 200. If the external input device 200 is not moved for a predetermined time, the power supply unit 250 stops supplying the electric power to reduce power consumption. When a predetermined key is operated, the power supply unit 250 resumes the supplying of the electric power.

The storage unit 260 stores various programs, applications, and frequency bandwidth information that are associated with the control and the operation of the external input device 200. In addition, the storage unit 260 stores IR format key codes for controlling the different external apparatuses with an IR signal, and stores IR format key database for the multiple external apparatuses.

The controller 270 generally controls what is associated with the control of the external input device 200. The controller 270 transmits a signal corresponding to the operation of the predetermined key of the user input unit 220 to the image display device 100 through the wireless communication unit 210. In addition, the controller 270 transmits the signal corresponding to the movement of the external input device 200 that is sensed by the sensing unit 230 to the image display device 100 through the wireless communication unit 210. The image display device 100 calculates coordinates of the pointer corresponding to the movement of the external input device 200.

Figure 3:
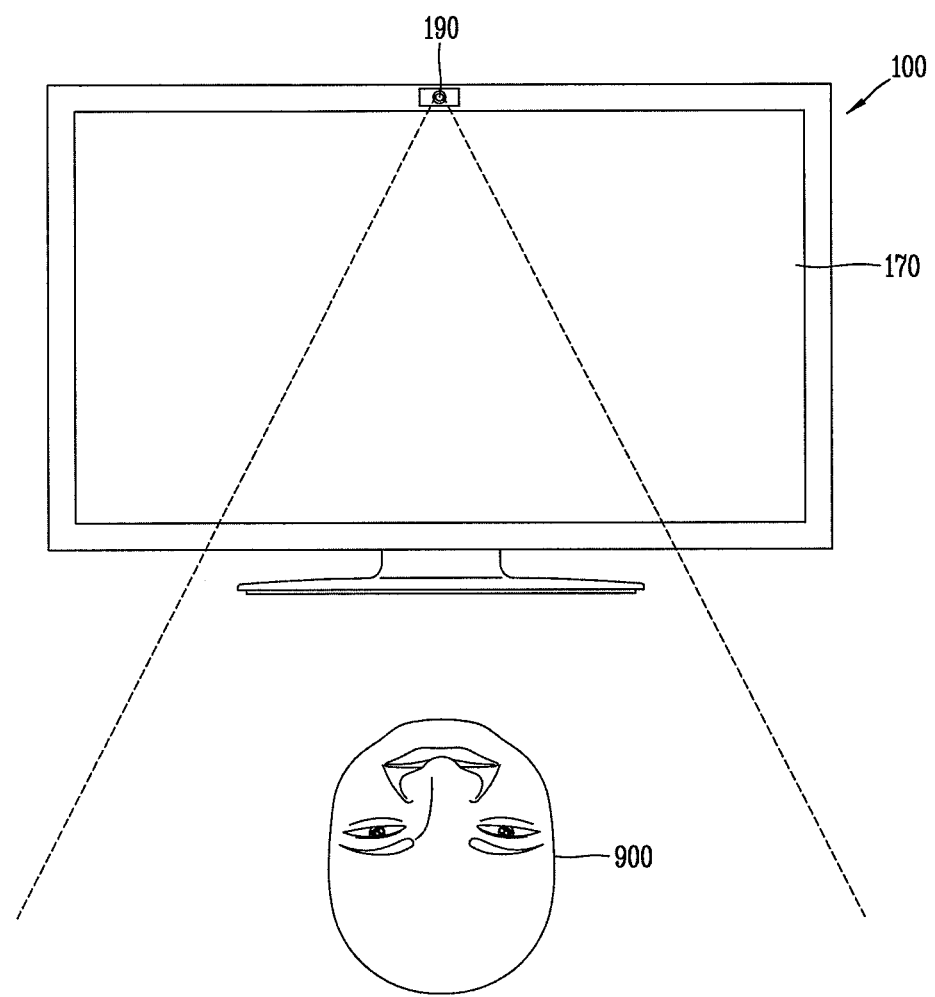
FIG. 3 is a diagram schematically illustrating that an image of a user is captured through a camera equipped with the image display apparatus according to the present invention.

FIG. 3 is a diagram illustrating that an image of the user is captured through a capturing unit 190 of an image display apparatus 100 according to the present invention. Here, a TV set is illustrated as an example of the image display apparatus 100 for the sake of description.

As illustrated in FIG. 3, for example, the capturing unit 190, that is, a camera that is arranged in the center of the upper end portion of a frame of the image display apparatus 100, detects positions of user's left and right eyes that are positioned within a predetermined range (for example, a viewing angle range of the camera) from the display unit 170. At this point, the camera is realized in such a manner that it is removably attached on the frame of the image display apparatus 100. That is, the camera may be built into the image display apparatus 100 or be removably attached to the frame of the image display apparatus.

When the positions of the user's left and right eyes are detected, the camera acquires information on a gaze of the user who views an image that is output to the image display apparatus 100. That is, a controller 150 of the image display apparatus 100 executes a corresponding control command in response to movement of the user's gaze in the upward and downward, leftward and rightward, and forward and backward directions and to the blinking of the user's left and right eyes.

Along with this, a pointer corresponding to the user's gaze may be displayed or may not be displayed on a screen of the image display apparatus 100. IF the pointer is displayed, the image display apparatus 100 calculates x and y coordinates of the corresponding pointer from the information on the user's gaze and displays the pointer corresponding to the calculated x and y coordinates on the display unit 170. Here, in addition to the form of an arrow illustrated in FIG. 3, the pointer is configured from an object in the form of a dot, a cursor, a prompt, a boundary line and a polygonal or the like.

On the other hand, if a control signal is combinedly input along with the user's gaze that is detected through the camera, the controller 150 performs a function corresponding to the control signal, which is input, on an indicator that is present in a position on which the user's gaze is fixed.

As illustrated in FIG. 3, for example, the capturing unit 190, that is, the camera that is arranged in one region, for example, the center of the upper end portion, of the frame of the image display apparatus 100, transfers to the controller 150 an image of the user 900 who is positioned within the predetermined range (for example, the viewing angle range) from the display unit 170, and accordingly the controller 150 outputs to the display unit 170 the captured image of the user. That is, an image capturing function or a video communication function of communicating images with a different external apparatus is possible to perform through the capturing unit 190.

The image display apparatus 100 according to an embodiment of the present invention, which has the configuration described above, includes the capturing unit 190 provided in a main body, a drive unit 195 that drives the capturing unit 190, and the controller 150 that transfers a control signal for selectively activating an operational mode that differs depending on whether or not to use an infrared light-cut filter.

The controller 150 of the image display apparatus 100 generates the control signal for selectively activating the operational mode, based on an image that is output to the display unit 170.

Specifically, when an image capture screen corresponding to a first function is output to the display unit 170 of the image display apparatus 100, the controller 150 outputs a first control signal for establishing the connection between an image sensor of the capturing unit 190 and the infrared light-cut filter.

Then, when the image capture screen corresponding to a second function is output to the display unit 170 of the image display apparatus 100, the controller 150 outputs a second control signal for establishing the connection between the image sensor of the capturing unit 190 and a visible light-cut filter.

At this point, both the first function and the second function are functions that include driving the capturing unit 190 and thus capturing an image. Specifically, the first function is a function for ordinary photographing or for visual communication and the second function is an infrared light photographing function for obtaining the information on the user's gaze using an infrared range of light.

As described above, the image display apparatus 100 according to the embodiment of the present invention provides an environment in which image capturing suitable for each function that is performed on the display unit 170 is possible with the single image sensor.

Figure 5A:
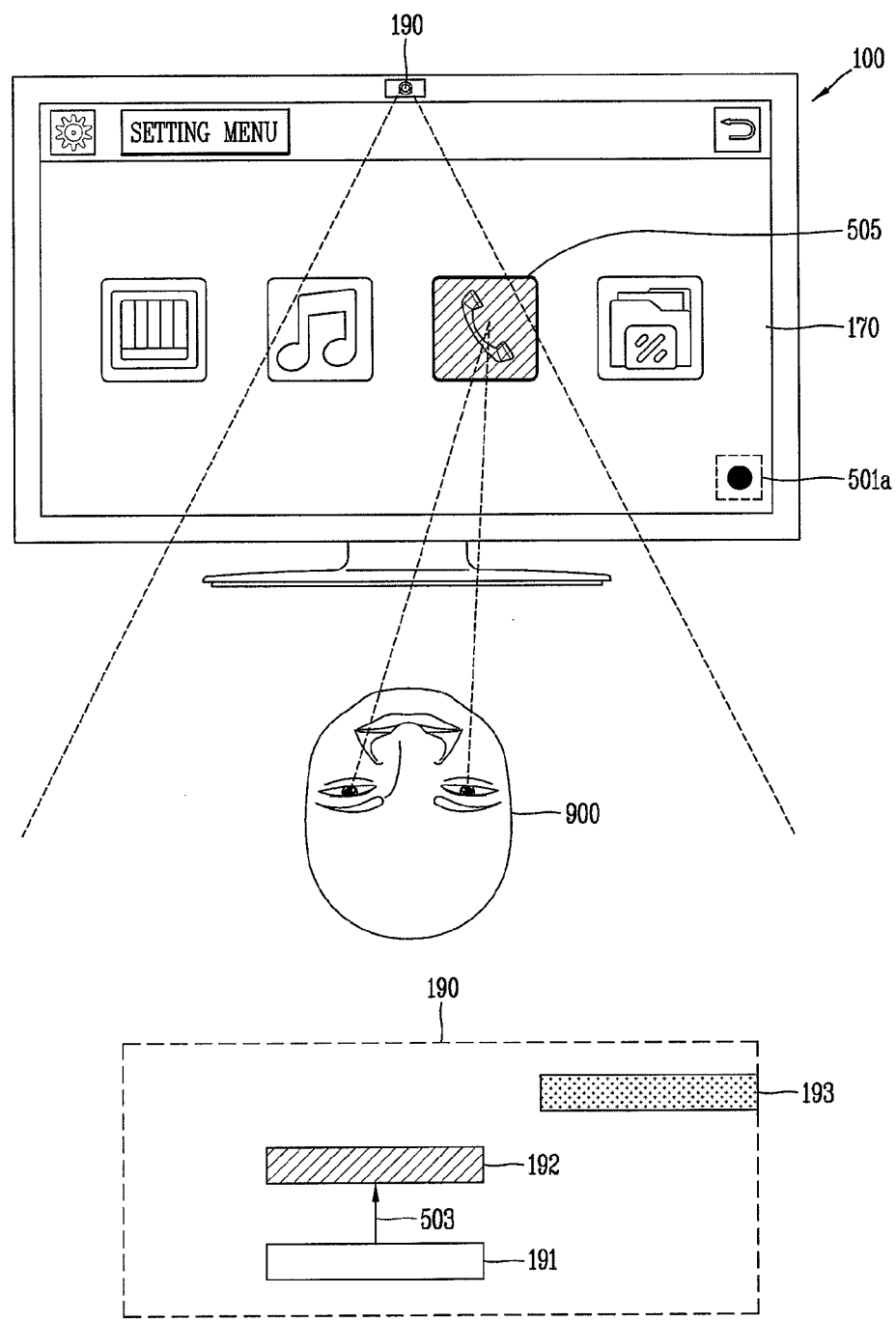
FIGS. 5A and 5B are diagrams for describing the operation method in FIG. 4.
Figure 5B:
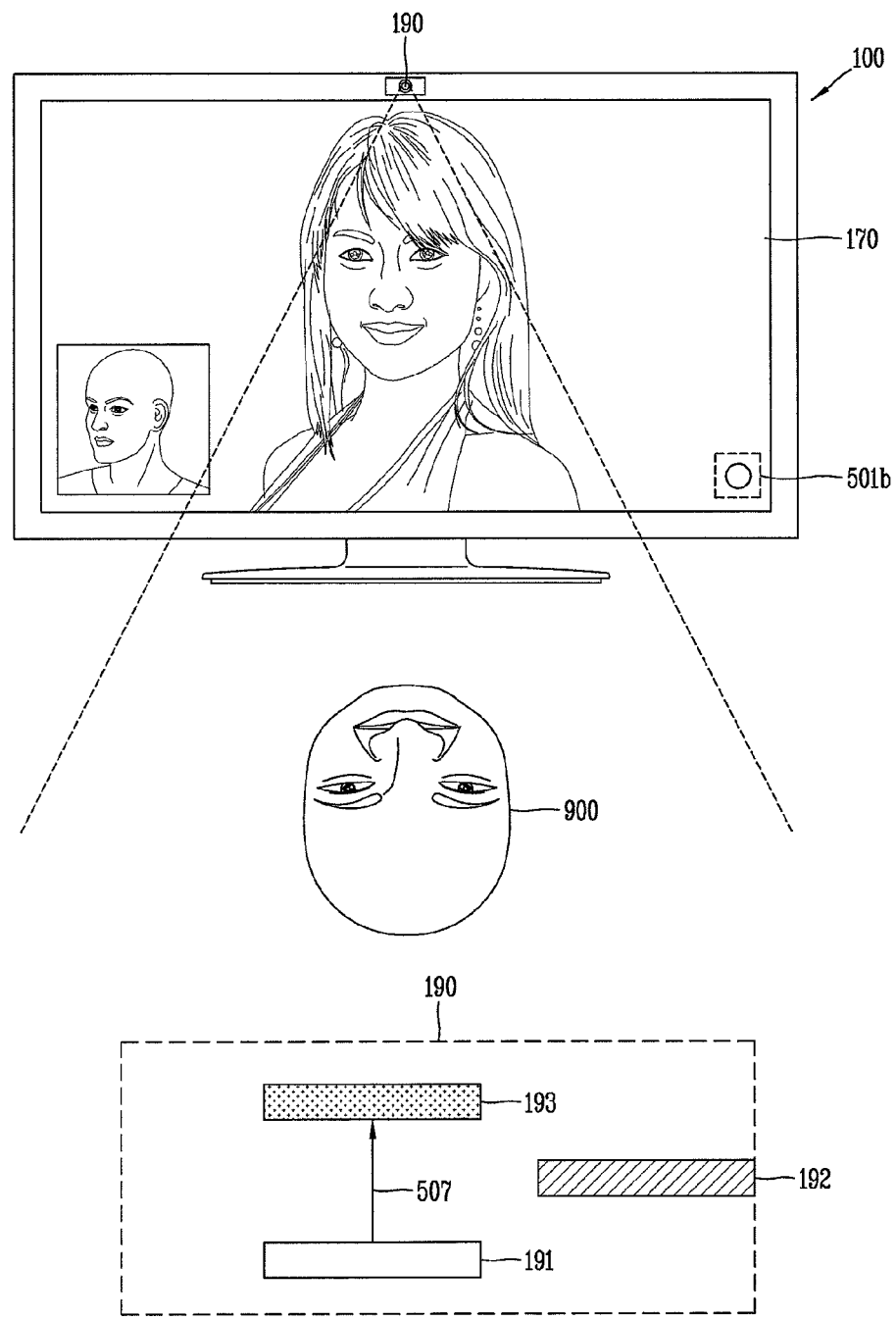

A method of operating the image display apparatus is described in more detail below referring to FIG. 4 and FIGS. 5A and 5B. In this context, FIG. 4 is a flow chart for describing the method of operating the image display apparatus according to one embodiment of the present invention, and FIGS. 5A and 5B are diagrams for describing the operating method in FIG. 4.

First, referring to FIG. 4, an image is output to the display unit 170 (refer to FIG. 1) of the image display apparatus 100 (refer to FIG. 1) (S401). If an infrared light photographing mode is activated through a user's input (S402), the capturing unit 190 of the image display apparatus 100 detects the gaze of the user who is present within a predetermined range from the display unit 170. Accordingly, the controller 150 obtains the information on the user's gaze.

At this point, the capturing unit 190 is configured in such a manner that it is removably attached to the main body of the image display apparatus 100, in which case the capturing unit 190 is arranged in one region (for example, the center of the upper end portion) of the frame of the main body.

In addition, the capturing unit 190 may be a camera module that is configured to include a single image sensor 191, and multiple cut filters, that is, a visible light-cut filter 192 and an infrared light-cut filter 193.

The image sensor 191 is realized as either of a charge coupled device (CCD) image sensor and a complementary metal-oxide semiconductor (CMOS) image sensor.

At this point, the charge coupled device (CCD) image sensor captures an image in a manner that moves a light-generated electron directly to an outputting unit using a gate pulse, and the complementary metal-oxide semiconductor image sensor captures the image in a manner that converts the light-generated electron into a voltage within each pixel and then outputs the result of the conversion through various CMOS switches.

The visible light-cut filter (VR-cut Filter) 192 filters (that is, cuts) visible light (in a wavelength band of approximately 380 nm to 800 nm) from light that enters through a lens (not illustrated) of the capturing unit 190 and transfers the result of the filtering to the image sensor 191. In addition, the infrared light-cut filter (IR-cut filter) 193 filters (that is, cuts) infrared light (in a wavelength band of approximately 750 nm to 1 mm) from the light that enters through the lens (not illustrated) of the capturing unit 190 and transfers the result of the filtering to the image sensor 191.

The visible light-cut filter 192 and the infrared light-cut filter 193 are configured in such a manner that they are arranged to be sideways in one direction and away from the image sensor 191 and be in parallel with each other. Alternatively, the visible light-cut filter 192 and the infrared light-cut filter 193 are configured in such a manner that they are arranged to be sideways in opposite directions, respectively and be in parallel with each other. Either of the visible light-cut filter 192 and the infrared light-cut filter 193, which are arranged in this manner, is connected to in front to the image sensor according to a control signal as described in detail below.

Specifically, the infrared light photographing mode is entered through the user's input (for example, any one of a key input, a voice command, and a gesture input) for using a user tracking function. Accordingly, the controller 150 transfers the control signal corresponding to the infrared light photographing mode to the drive unit 195. The drive unit 195 connects the image sensor 191 to the visible light-cut filter 192 according to the control signal that is received from the controller 150 and then drives the capturing unit 190. Then, the capturing unit 190 emits infrared light with the visible light-cut filter 192 connected to in front of the image sensor 191 and captures the image of the user. Then, the controller 150 receives the captured image and obtains the information on the user's gaze.

For example, referring to FIG. 5A, in the infrared light photographing mode, the capturing unit 190 emits infrared (Ir) light to the user's left and right eyes, and the capturing unit 190 recognizes an image reflected from the user's left and right eyes. The controller 150, as illustrated in FIG. 5A, detects that the gaze of the user 900 is fixed on a specific icon 505 displayed on the display unit 170. In this manner, the connection is established between the image sensor 191 of the capturing unit 190 and the visible light-cut filter 192 in the infrared light photographing mode (503). That is, the image is captured with the visible light-cut filter 192 arranged in front of the image sensor 191, and thus movements of pupils of the user's left and right eyes in a more precise manner.

In this manner, while the infrared light photographing mode is activated, the controller 150 determines whether or not the image display apparatus 100 enters an ordinary photographing mode (S403). That is, the controller 150 detects that a photographing mode is changed from the infrared light photographing mode to the ordinary photographing mode.

At this point, the ordinary photographing mode is an operational mode for performing ordinary image capturing, in which the user tracking function of recognizing the positions of the user's left and right eyes and tracking the movements of the pupils is not performed. For example, in the ordinary photographing mode, all image capturing that is not for tracking the movements of the pupils of the user's left and right eyes is performed, such as simple photographing and image capturing for video telephone call.

If it is determined in Step S403 that the photographing mode is changed from the infrared light photographing mode to the ordinary photographing mode, the controller 150 provides the drive unit 195 with a control signal for establishing the connection between the image sensor 191 of the capturing unit 190 and the infrared light-cut filter 193 (S404). At this point, the connection between the image sensor 191 and the visible light-cut filter 192 or the connection between the image sensor 191 and the infrared light-cut filter 193 is selectively established. Accordingly, the connection between the image sensor 191 and the visible light-cut filter 193 is released, or the connection between the image sensor 191 and the visible light-cut filter 192 is released.

For example, referring to FIG. 5B, if the photographing mode is changed from the infrared light photographing mode to the ordinary photographing mode, for example, the video telephone call, the capturing unit 190 captures the image of the user 900 who is present within the predetermined range (for example, the viewing angle range of a camera 190) from the display unit 170. The captured image of the user 900 is output to the entire display unit 170 or is output to one region of the display unit 170 in the form of a floating image.

When the photographing mode is changed from the infrared light photographing mode to the ordinary photographing mode in this manner, the connection is established between the image sensor 191 of the capturing unit 190 and the infrared light-cut filter 193 (507). That is, the image of the user is captured with the infrared light-cut filter 193 arranged in front of the image sensor 191. At this point, the visible light-cut filter 192, as illustrated in FIG. 5B, is slid sideways and away from the image sensor 191. Since the infrared light-cut filter 193 is arranged in front of the image sensor 191 in this manner, the image sensor 191 is no longer unnecessarily sensitive to light in the infrared light band and thus an original color of the captured image is made easy to reproduce.

On the other hand, the controller 150 determines whether the ordinary photographing (for example, the video telephone call) is terminated, also while the ordinary photographing mode is activated (S405). When it is determined that the video telephone call is terminated, the controller 150 provides the drive unit 195 with the control signal for again establishing the connection between the image sensor 191 of the capturing unit 190 and the visible light-cut filter 192 (S406).

At this point, the previous connection 507 between the image sensor 191 and the infrared light-cut filter 193 is released. That is, only the visible light-cut filter 192 is arranged in front of the image sensor 191.

For example, referring FIGS. 5A and 5B, when the ordinary photographing mode is changed back to the infrared light photographing mode, the infrared light-cut filter 193 that is arranged in front of the image sensor 191 in FIG. 5B is slid in one direction (for example, in the rightward direction) as illustrated in FIG. 5A, and the visible light-cut filter 192 that is positioned sideways and away from the image sensor 191 is arranged in front of the image sensor 191 as illustrated in FIG. 5A.

On the other hand, the controller 150 outputs to the display unit 170 an indicator corresponding to the control signal that is output when a change is made from the first function (for example, a video telephone call mode) to the second function (for example, the infrared light photographing mode), or conversely, when the change is made from the second function (for example, the infrared light photographing mode) to the first function (for example, the video telephone call mode).

For example, in FIG. 5A, an indicator 501a corresponding to the second function (for example, the infrared light photographing mode) is displayed on one region of the display unit 170, for example, the lower right-handed region. The indicator 501a is displayed in any form of an image or text indicating that the image captured by the capturing unit 190 is obtained by emitting light in the infrared light band. That is, the indicator 501a is displayed as an indicator in the form of a black circle, but is not limited to the black circle and the indicator 501a is moved to a different region of the display unit 170 or is made to disappear from the display unit 170.

In addition, for example, an indicator 501b corresponding to the first function (for example, the video telephone call mode) is displayed on one region of the display unit 170, for example, the lower right-handed region in FIG. 5B. As described above, it is possible to change a shape or a position of the indicator 501b and also to make the indicator 501b disappear from the display unit 170.

As described above, if a video telephone call function is performed while performing the user tracking function or the user tracking function is performed while performing the video telephone call function, the image display apparatus 100 according to the embodiment of the present invention performs the image capturing suitable for each function only with the single image sensor and thus obtains accurate information corresponding to the function without adding a new configuration.

The method of operating the image display apparatus is described in detail below referring to FIGS. 6A and 6B in which the suitable image is captured according to the function that is performed in the image display apparatus 100 described above or according to variously-changing situations.

Figure 6A:
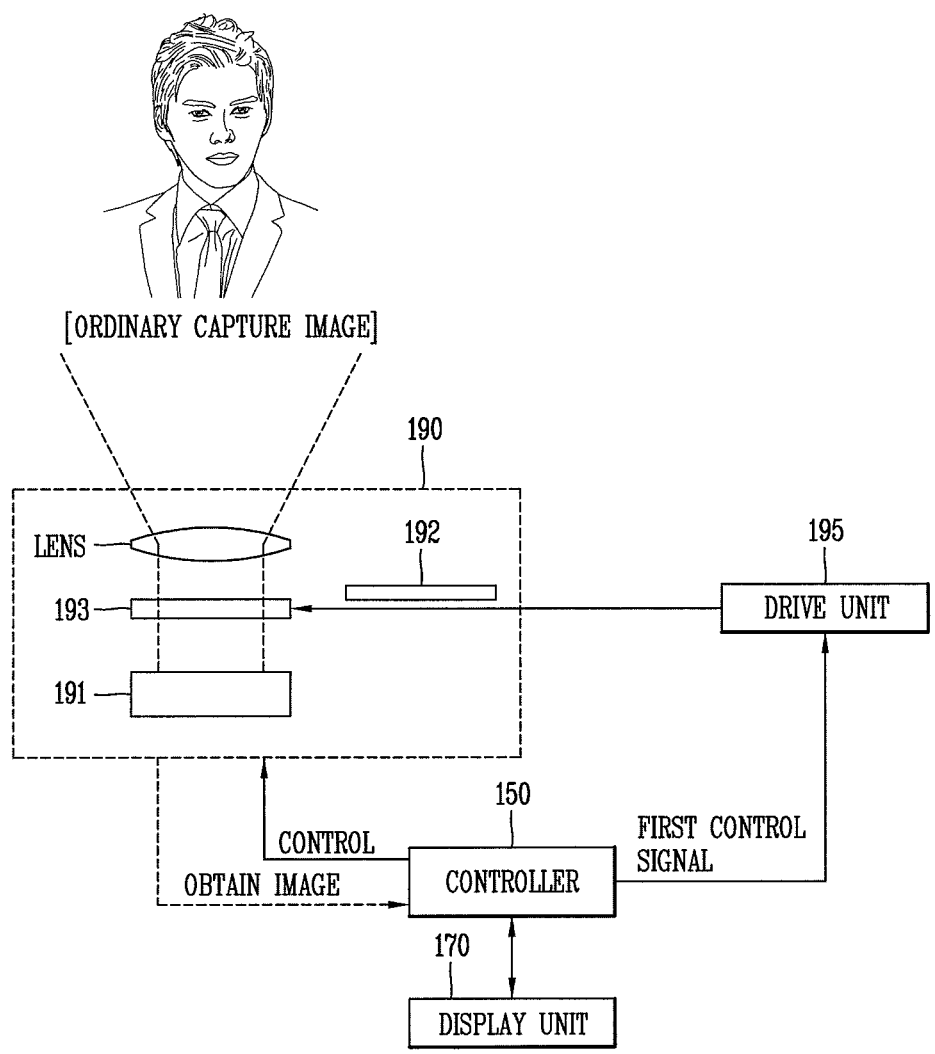
FIGS. 6A and 6B are diagrams, each illustrating that a connection between an image sensor of a camera and a filter is established to capture a suitable image according to a function that is performed in the image display apparatus according to the embodiment of the present invention.
Figure 6B:
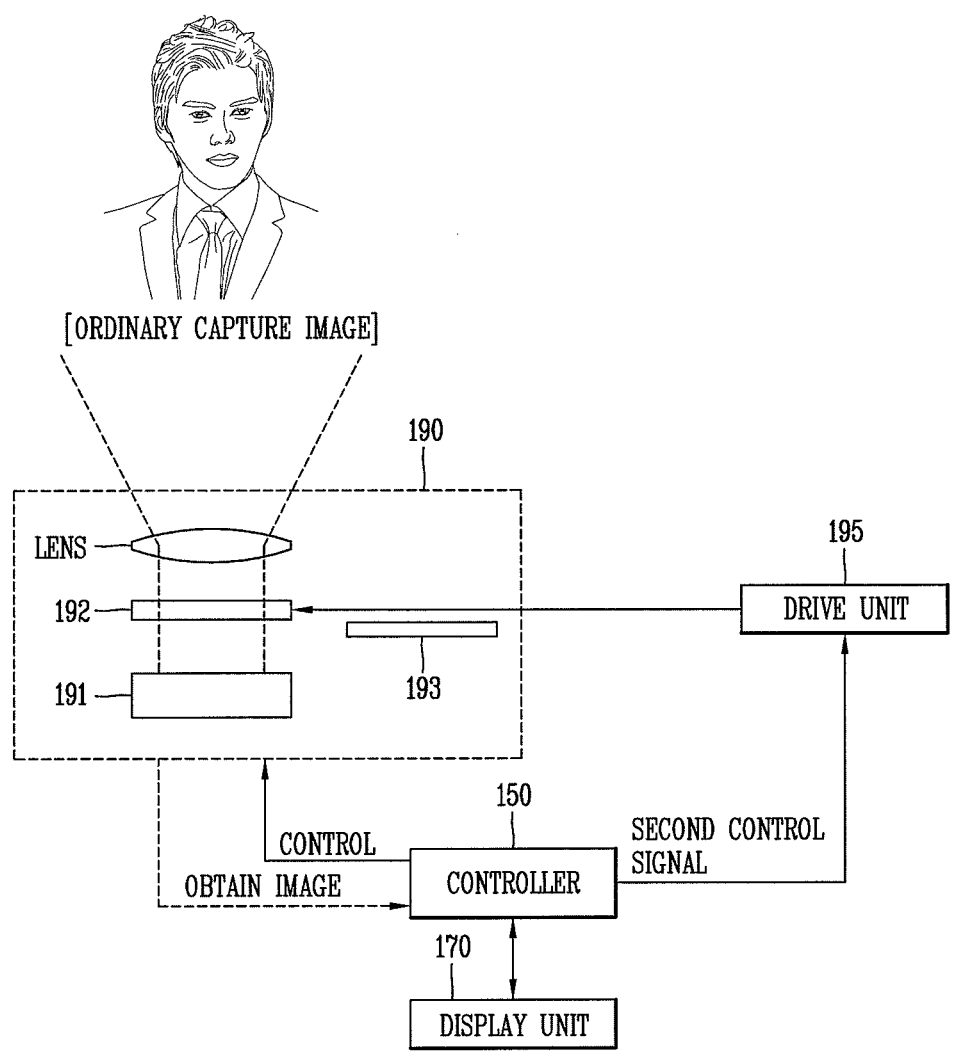

In this context, FIGS. 6A and 6B are diagrams, each illustrating that a filter that is connected to in front of the image sensor of the camera is changed to capture the suitable image according to the function performed in the image display apparatus, according to the embodiment of the present invention.

First, when a predetermined image is output to the display unit 170 (refer to FIG. 1) of the image display apparatus 100 (refer to FIG. 1) and the infrared light photographing mode is activated through the user's input, the controller 150 performs control in such a manner that the capturing unit 190 is driven to obtain the information on the user's gaze, and accordingly, the capturing unit 190 of the image display apparatus 100 detects the gaze of the user who is present within a predetermined range from the display unit 170.

The method of operating the image display apparatus 100 in order for the controller 150 to obtain the suitable image in the infrared light photographing mode is described below.

First, when the user's input (for example, any one of the key input, the voice command, and the gesture input) for using the user tracking function is detected, the image display apparatus 100 enters the infrared light photographing mode.

When the infrared light photographing mode is entered, the controller 150 transfers the control signal corresponding to the infrared light photographing mode to the drive unit 195, and the drive unit 195 drives the capturing unit 190 according to the control signal that is received from the controller 150, with the connection established between the image sensor 191 included in the capturing unit 190 and the visible light-cut filter 192. Then, the capturing unit 190 captures the image of the user by emitting infrared light with the visible light-cut filter 192 connected to in front of the image sensor 191, and the controller 150 receives the captured image and thus obtain according to the movements of the pupils of the user's left and right eyes.

Specifically, referring to FIG. 6B, when the second function is performed in the display unit 170, for example, when a screen for capturing an image corresponding to the user tracking function is output to the display unit 170, the controller 150 provides the user tracking function with a preparation signal for obtaining the image of the user. Along with this, the controller 150 outputs a second control signal (for example, "0") to the drive unit 195. When the second control signal is received, the drive unit 195 slides the visible light-cut filter 192 to position it in front of the image sensor 191 that is provided in the capturing unit 190. Accordingly, the visible light-cut filter 192 is in an ON state, and the infrared light-cut filter 193 is in an OFF state. Thus, the capturing unit 190 captures an infrared light (IR) image. The controller 150 analyzes the infrared light image provided from the capturing unit 190 and thus detects gaze changes corresponding to the movements of the pupils of the user's left and right eyes and calculates a coordinate value for a point on the display unit 151 or a region of the display unit 151, on which the user's gaze is fixed.

On the other hand, there are broadly two methods of establishing the connection between the image sensor 191 and the visible light-cut filter 192 or between the connection between the image sensor 191 and the infrared light-cut filter 193 according to the control signal that is received from the controller 150: a sliding method and a shutter method. However, the connection method is not limited to these, but it is apparent to a person of ordinary skill in the art that the connection can be performed and the connection can be released in different methods according to mechanical and spatial limitations that result from a form and a location of the image display apparatus 100.

Specifically, in a case of the sliding method, when a first control signal (for example, "1") is received from the controller 150 of the image display apparatus 100, the drive unit 195 drives the capturing unit 190 in such a manner that the infrared light-cut filter 193 positioned sideways in one direction and away from the image sensor 191 is slid and thus is positioned in front of the image sensor 191. In contrast, when the second control signal (for example "0") is received from the controller 150, the drive unit 195 drives the capturing unit 190 in such a manner that the visible light-cut filter 192 positioned sideways in one direction and away from the image sensor is slid and thus is positioned in front of the image sensor 191. Along with this, the infrared light-cut filter 193 positioned in front of the image sensor 191 is slid to its original position.

On the other hand, in the switching method, first, at least one switch (not illustrated) is included within the capturing unit 190 or in the image display apparatus 100, and an on/off operation is performed on the infrared light-cut filter 193 and the visible light-cut filter 192 according to the control signal that is output from the controller 150.

For example, the drive unit 195 operates a switching element provided in a switch (not illustrated) according to the control signal that is transferred from the controller 150 and thus selectively activates either of a first mode for establishing the connection between the image sensor 191 and the infrared light-cut filter 193 or a second mode for establishing the connection between the image sensor 191 and the visible light-cut filter 192.

In this manner, also while the infrared light photographing mode is activated, the controller 150 determines whether or not the image display apparatus 100 enters the ordinary photographing mode. That is, the controller 150 detects that the image display apparatus 100 changes the photographing mode from the infrared light photographing mode to the ordinary photographing mode in response to the user's input or an occurrence of an event.

At this point, the ordinary photographing mode is an operational mode for performing ordinary image capturing, in which the user tracking function of recognizing the positions of the user's left and right eyes and tracking the movements of the pupils is not performed. For example, in the ordinary photographing mode, all image capturing that is not for tracking the movements of the pupils of the user's left and right eyes is performed, such as simple photographing and image capturing for video telephone call.

If it is determined in Step S403 that the photographing mode is changed from the infrared light photographing mode to the ordinary photographing mode, the control unit 150 provides the drive unit 195 with the control signal for establishing the connection the image sensor 191 of the capturing unit 190 and the infrared light-cut filter 193 (S404).

If the photographing mode is changed from the infrared light photographing mode to the ordinary photographing mode, the method of operating the image display apparatus 100 to obtain the image suitable for the ordinary photographic mode is described below.

When the photographing mode is changed from the infrared light photographing mode to the ordinary photographing mode, the controller 150 transfers to the drive unit 195 the control signal corresponding to the infrared light photographing mode that results from the changing of the photographing mode, and according to the control signal that is received from the controller 150, the drive unit 195 connects the image sensor 191 included in the capturing unit 190 to the infrared light-cut filter 193 and thus drives the capturing unit 190. Then, the capturing unit 190 captures the image of the user with the infrared light-cut filter 193 connected to in front of the image sensor 191, and the controller receives the captured image and outputs the captured image to the display unit 170.

Specifically, referring to FIG. 6A, when the first function is performed in the display unit 170, for example, when a screen for capturing an image corresponding to the video telephone call function is output to the display unit 170, the controller 150 provides the user tracking function with the preparation signal for obtaining the image of the user. Along with this, the controller 150 outputs the first control signal (for example, "1") to the drive unit 195. When the first control signal is received, the drive unit 195 slides the visible light-cut filter 193 to position it in front of the image sensor 191 that is provided in the capturing unit 190. Accordingly, the infrared light-cut filter 193 is in an ON state, and the visible light-cut filter 192 is in an OFF state. Thus, the capturing unit 190 captures an ordinary image. The controller 150 receives a signal of the ordinary image from the capturing unit 190 and signal-processes the signal, and then outputs the signal-processed ordinary image to the display unit 170.

The controller 150 determines whether the ordinary photographing (for example, the video telephone call) is terminated, also while the ordinary photographing mode is activated. When it is determined that the video telephone call is terminated, the controller 150 provides the drive unit 195 with the control signal for again establishing the connection between the image sensor 191 of the capturing unit 190 and the visible light-cut filter 192.

That is, in the ordinary photographing mode, the controller 150 of the image display apparatus 100 outputs the first control signal to establish the connection between the image sensor 191 and the infrared light-cut filter 193. In the infrared light photographing mode, the controller 150 outputs the second control signal to establish the connection between the image sensor 191 and the visible light-cut filter 192.

However, even though the function being performed on the display unit 170 is in the ordinary photographing mode, "in a state of low intensity of illumination," the controller 170 exceptionally outputs the control signal for establishing the connection between the image sensor 191 and the visible light-cut filter 192.

At this point, the state of low intensity of illumination refers to a state where a shutter speed of the camera needs to be adjusted because average brightness of a captured image of a photographic subject does not exceed a predetermined reference value although IRIS opening of the camera (an amount of light that enters through the lens) is increased and an analog gain value is increased.

The capturing unit 190 detects an ambient intensity-of-illumination value from the captured image and provides the controller 150 with the ambient intensity-of-illumination value. Thus, the controller 150 determines whether the detected ambient intensity-of-illumination value corresponds to the state of low intensity of illumination. When it is detected that ambient intensity of illumination is the low intensity of illumination in the state where the screen for capturing the image corresponding to the first function (for example, the video telephone call function) is output to the display unit 170, the controller 150 outputs the second control signal, not the first control signal, to the drive unit 195. Accordingly, also in the ordinary photographing mode, the capturing unit 190 captures an image with the connection established between the image sensor 191 and the visible light-cut filter 192. Specifically, if visible light whose brightness is greater than the ambient brightness enters through the lens, since the connection is established between the image sensor 191 and the visible light-cut filter 192, the quality of the captured image is improved in that the captured image is clearer, and thus things are easy to identify because there is no motion blur.

In addition, "if the camera does not need to be driven" or "in a slip mode," the controller 150 exceptionally outputs the control signal (for example, the second control signal ("0")) for establishing the connection between the image sensor 191 and the visible light-cut filter 192. That is, when the connection between the image sensor 191 and the visible light-cut filter 192 is set to be a default connection, if the infrared light photographing mode is entered thereafter, the control signal for establishing the connection between the image sensor 191 and the visible light-cut filter 192 does not need to be output.

The default setting can be changed through the user's input. That is, the ordinary photographing mode for establishing the connection between the image sensor 191 and the infrared light-cut filter 193 is set to be a default position.

In addition, "if a user's position is not detected for a predetermined time" even though the function being performed in the display unit 170 is in the infrared light photographing mode," the controller 170 exceptionally outputs the control signal, that is, the first control signal, for establishing the connection between the image sensor 191 and the visible light-cut filter 192.

For example, if the user's position is out of the predetermined range from the display unit 170 for a predetermined time (for example, three minutes or more) in a state where the second function is performed in the display unit, for example, in a state where the screen for capturing the image corresponding to the user tracking function is output to the display unit 170, the controller 150 outputs the first controls signal to the drive unit 195. Accordingly, the connection is established between the image sensor 191 and the infrared light-cut filter 193, and thus an effect, like one in which the photographing mode is changed to the ordinary photographing mode, occurs.

A method of operating the image display apparatus is described in detail below in which the suitable image is captured if the screen corresponding to the infrared light photographing mode and the screen corresponding to the ordinary photographing mode are output to the display unit 170 of the image display apparatus 100 at the same time.

Figure 7:
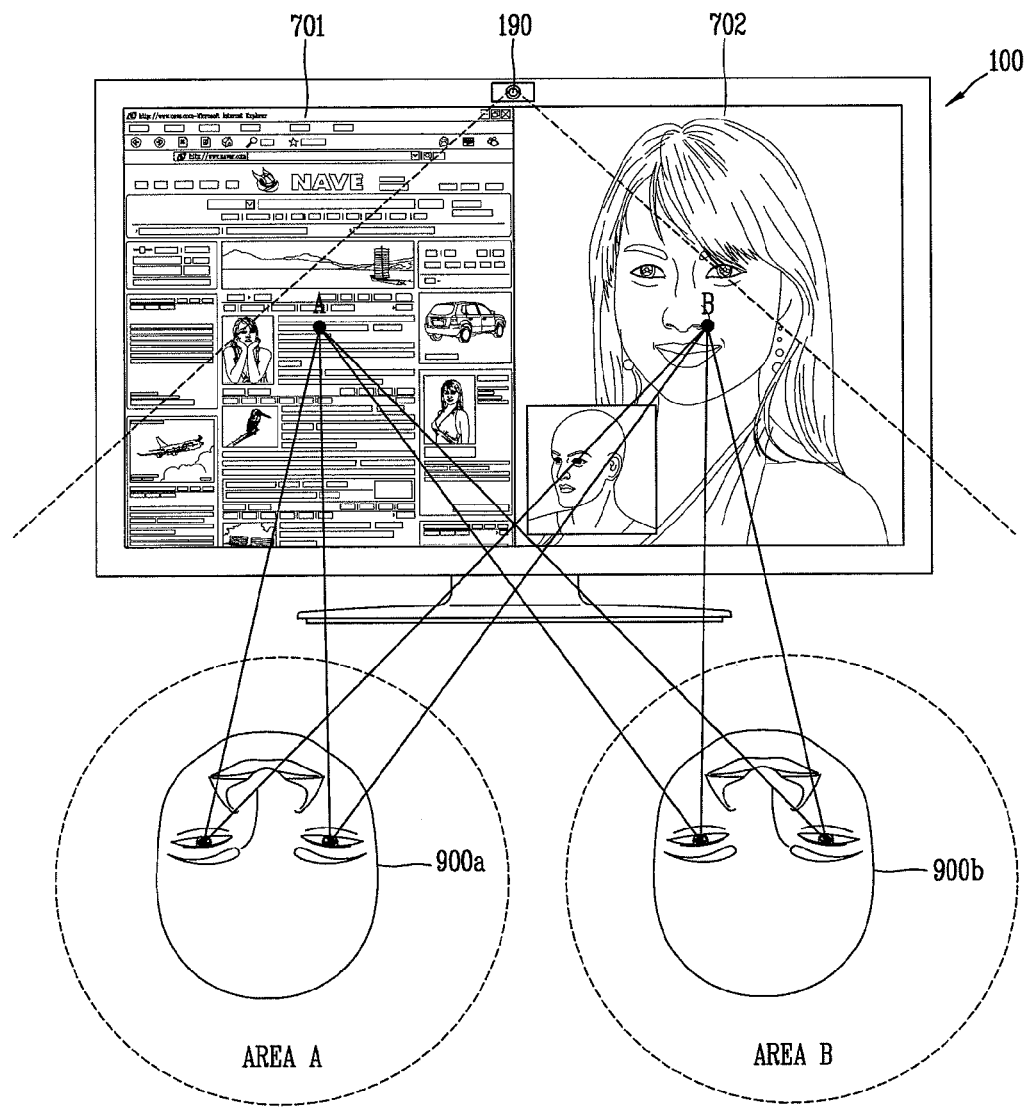
FIG. 7 is a diagram for describing the connection that is established between the image sensor of the camera and the filter according to a change in a gaze of the user according to the embodiment of the present invention.
Figure 8:
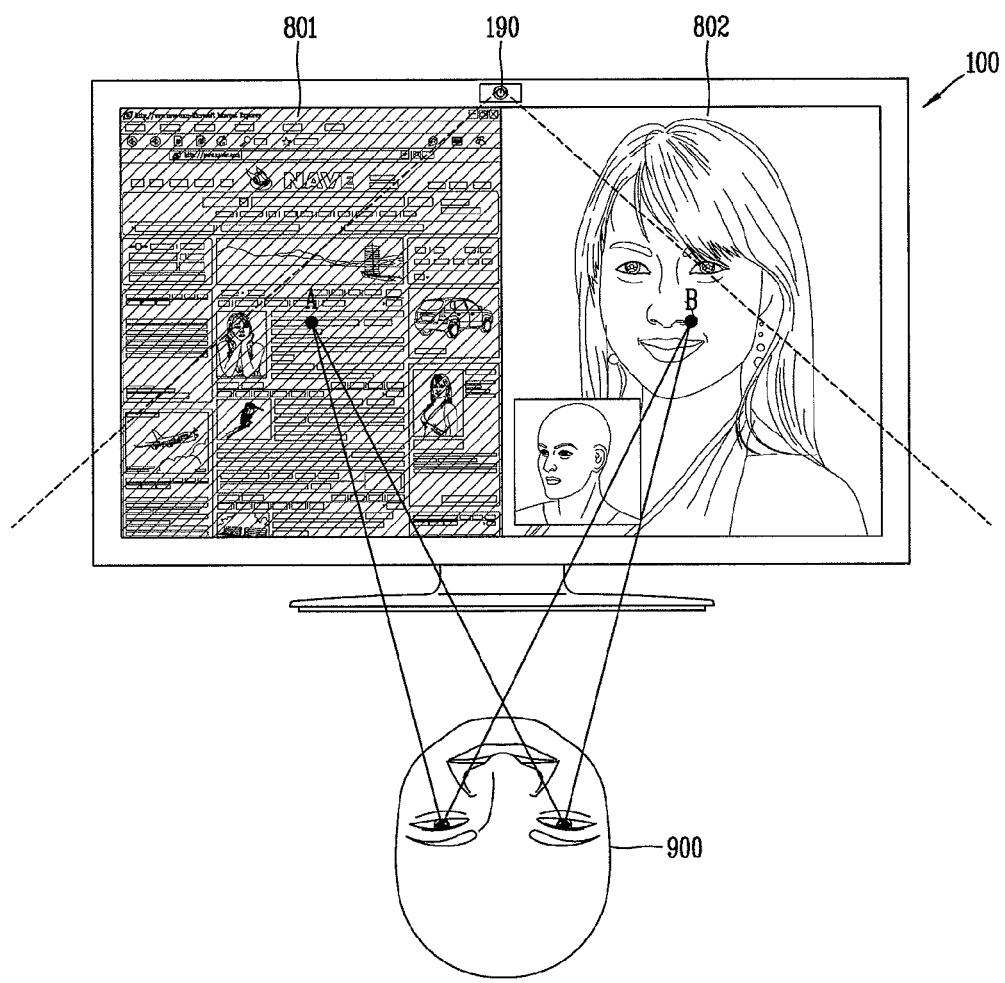
FIG. 8 is a diagram for describing the connection that is established between the image sensor of the camera and the filter according to a screen that is activated.

In this context, FIG. 7 is a diagram for describing the connection between the image sensor of the camera and the filter that depends on a change in the user's gaze, according to the embodiment of the present invention, and FIG. 8 is a diagram for describing the connection between the image sensor of the camera and the filter that depends on the activated screen, according to the embodiment of the present invention.

The display unit 170 (refer to FIG. 1) of the image display apparatus 100 (refer to FIG. 1) is divided into a first region (for example, a left-handed region) and a second region (for example, a right-handed region), and two different images are output to the first and second regions, respectively.

For example, the controller 150 outputs to the first region of the display unit 170 the screen for capturing the image corresponding to the first function (for example, the user tracking function) and outputs to the second region of the display unit 170 the screen for capturing the image corresponding to the second function (for example, the ordinary photographing mode).

In a state where the screens corresponding to the multiple functions are output to the display unit in a manner that distinguish between them, the controller 150 provides the drive unit 195 with the second control signal, and thus performs the control in such a manner that the image of the user is captured with the connection established between the image sensor 191 the visible light-cut filter 192 and the change in the user's gaze is accordingly detected.

When the result of detecting the change in the user's gaze shows that the user's gaze detected through the capturing unit 190 is fixed on the first region of the display unit 170, the controller 150 outputs the first control signal to the drive unit 195. Accordingly, the connection between the image unit 191 and the visible light-cut filter 192 is released (off), and the connection between the image sensor 191 and the infrared light-cut filter 193 is established (on). Thus, the capturing unit 190 captures the ordinary image.

For example, referring to FIG. 7, if a user 900a or 900b fixes his/her gaze on the right-handed region of the display unit 170, that is, a point B, the controller 150 outputs the control signal for establishing the connection between the image sensor 191 and the infrared light-cut filter 193 in such a manner that the image of the user displayed on a video telephone call screen 702 that is output is captured in the ordinary photographing mode.

At this point, the user's position is not a consideration. That is, if a point on which the user's gaze is fixed is on the right-handed region of the display unit 170 regardless of the user being positioned in a region A (900a) or of the user being positioned in a region B (900b), for example, if the user's gaze is fixed on the point B, the controller 150 output the control signal for establishing the connection between the image sensor 191 and the infrared light-cut filter 193.

Then, when the result of detecting the change in the user's gaze shows that the user's gaze detected through the capturing unit 190 is fixed on the second region of the display unit 170, the controller 150 outputs the second control signal to the drive unit 195. Accordingly, the connection between the image sensor 191 and the infrared light-cut filter 193 is released (off), and the connection between the image sensor 191 and the visible light-cut filter 193 is established (on). Thus, the capturing unit 190 captures the infrared light image.

For example, if the user 900a or 900b fixes his/her gaze on the left-handed region of the display unit 170, that is, a point A, in FIG. 7, the controller 150 outputs the control signal for establishing the connection between the image sensor 191 and the visible light-cut filter 192 in such a manner that the user's gaze on a web page screen 701 that is output is captured in the infrared light photographing mode. Accordingly, in the infrared light photographing mode, the controller 150 of the image display apparatus 100 scrolls through the web page screen 701 according to the direction of the user's gaze or proceeds to a next page.

At this point, as described above, the user's position is not a consideration, and it is considered only whether the point on which the user's gaze is fixed is on the left-handed region of the display unit 170, for example, only whether the user's gaze is fixed on the point A.

In addition, a condition for determining that the user's gaze is fixed is limited to when the user's gaze is fixed on one region of the display unit 170 or on one point on the display unit 170 for a predetermined time.

On the other hand, in this manner, in a state where the screens corresponding to the multiple functions are output to the display unit 170 in a manner that distinguishes between them, the controller 150 activates the operational mode in which the image suitable for the function corresponding to the screen activated in the display unit 170 is captured.

Specifically, if the screen that is output to the first region of the display unit 170 is activated and the screen that is output to the second region of the display unit 170 is inactivated, the controller 150 outputs the first control signal. Conversely, if the screen on the second region of the display unit 170 is activated and the screen on the first region of the display unit 170 is inactivated, the controller 150 outputs the second control signal.

For example, referring FIG. 8, if the function in the infrared light photographing mode for detecting the user's gaze has to be performed in the left-handed region of the display unit 170 and the function in the ordinary photographing mode for detecting the image of the user has to be performed in the right-handed region of the display unit 170, the controller 150 performs the control in such a manner that if the user's gaze is fixed on the point A on the left-handed region or on the point B on the right-handed region, the photographing mode suitable for the screen that is output to the left-handed region in an activated state. That is, even though the user 900 gaze at the point A, the capturing unit 190 captures the image of the user in the ordinary photographing mode for establishing the connection between the image sensor 191 and the infrared light-cut filter 193.

In addition, when in this manner, the state is terminated in which the screens corresponding to the multiple functions are output to the display unit 170 in a manner that distinguishes between them and when a change is made to a state in which the screen corresponding to one function is output to the entire display unit 170, the controller drives the capturing unit 190 in the same manner as described above.

That is, when the infrared light photographing mode is activated through the user's input, the capturing unit 190 of the image display apparatus 100 detects the gaze of the user who is present within a predetermined range from the display unit 170 and accordingly obtains the information on the user's gaze.

In addition, while the infrared light photographing mode is activated in this manner, the controller 150 detects that the image display apparatus 100 changes the photographing mode from the infrared light photographing mode to the ordinary photographing mode. When the photographing mode is changed from the infrared light photographing mode to the ordinary photographing mode, the controller 150 provides the drive unit 195 with the control signal for establishing the control between the image sensor 191 of the capturing unit 190 and the infrared light-cut filter 193.

On the other hand, the controller 150 detects that the ordinary photographing (for example, the video telephone call) is terminated. When the result of the detection shows that the video telephone call is terminated, the controller 150 provides the drive unit 195 with the control signal for again establishing the connection between the image sensor 191 of the capturing unit 190 and the visible light-cut filter 192.

In the image display apparatus 100 according to the embodiment of the present invention, which has the configuration described above, the capturing unit 190 for photographing the image of the user is mounted on or is built into a bezel portion 172 that is formed along the edge of the front side of the display unit 170.

At this point, the capturing unit 190 may be a camera module that includes a single image sensor and multiple cut filters, for example, a visible light-cut filter (not illustrated) and an infrared light-cut filter (not illustrated). The image sensor 191 is realized as either of a charge coupled device (CCD) image sensor and a complementary metal-oxide semiconductor (CMOS) image sensor.

Then, multiple infrared light emitting elements (for example, infrared LEDs, and the "infrared light emitting element" and the infrared LED" are hereinafter interpreted as having the same meaning), which are arranged to be spaced a predetermined distance relative to one another and away from the capturing unit 190, are built into the bezel portion 172. At this point, the total number of multiple infrared light emitting elements that are arranged to be spaced the predetermined distance relative to one another and away from the capturing unit 190 is considerably smaller that the number of infrared LEDs that are required when using an ordinary infrared light camera.

Figure 9A:
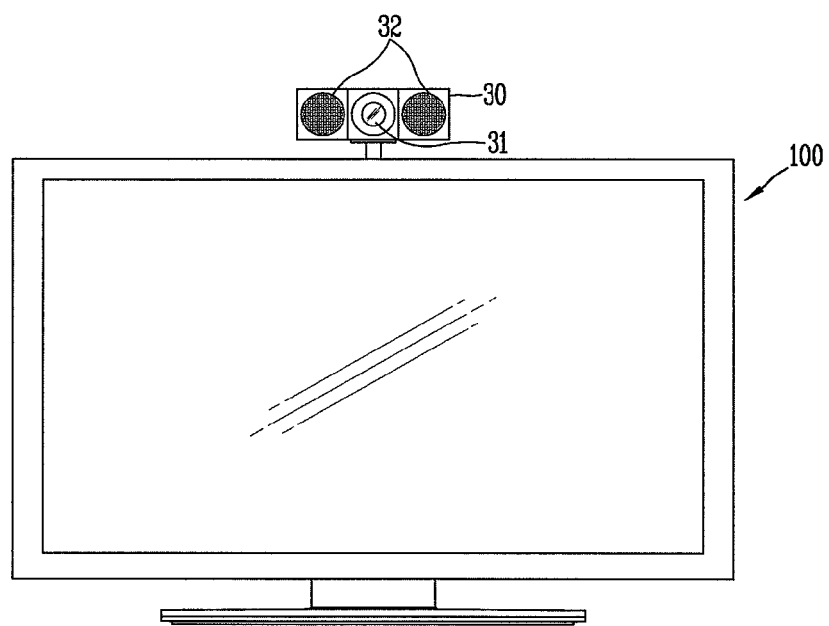
FIGS. 9A to 9C are diagrams illustrating a light emitting ranges of infrared LEDs according to driving of the camera in a case where a user tracking function is performed using an ordinary infrared light camera.
Figure 9B:
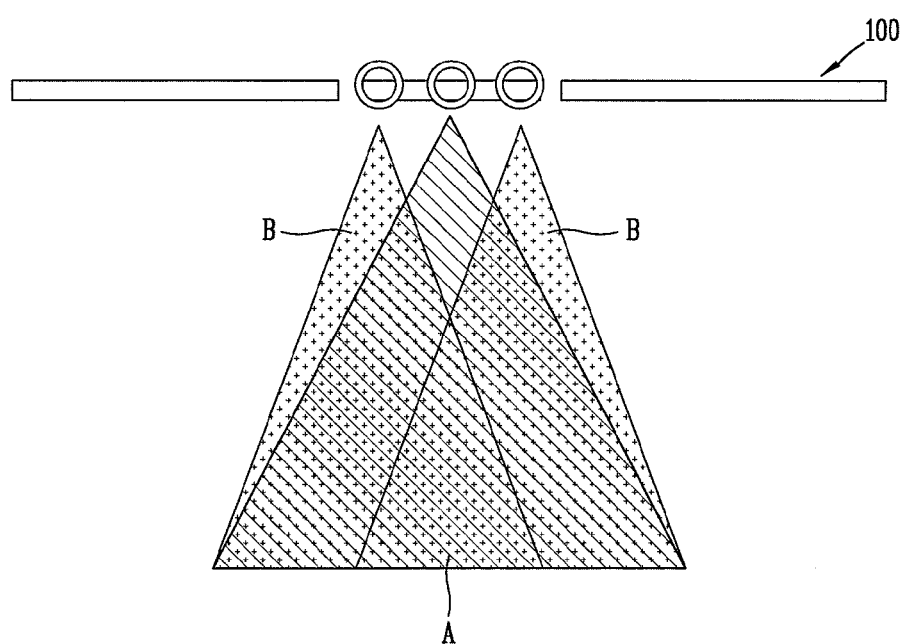
Figure 9C:
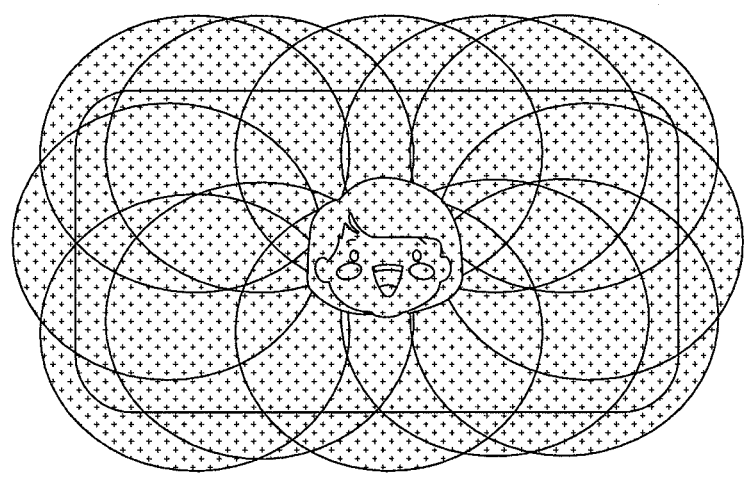

In this context, referring to FIGS. 9A to 9C, if an infrared light camera 31 is mounted on the upper end portion of a display module in the image display apparatus in the related art, many infrared LEDs 32, as illustrated in FIG. 9B, are close-spaced and arranged to be adjacent to both sides of the infrared light camera 31 in order to cover a viewing angle range A of the camera. when the ordinary infrared light camera 31 is driven in this configuration, the adjacent infrared LEDs 32 emit light at the same time and thus form a light emitting range B including the viewing angle range A of the camera. In this manner, the infrared camera mounted on the image display apparatus 100 in the related art requires the large number of infrared LEDs 32 and once the infrared light camera 31 is driven, the infrared LEDs 32 close-spaced and arranged emit light at the same time. Thus, as illustrated in FIG. 9C, a larger number of portions of the light emitting ranges of the infrared LEDs than necessary overlap one another, resulting in increasing power consumption.

On the other hand, the image display apparatus 100 according to the embodiment of the present invention is realized as having a structure in which the multiple infrared light elements are built into the bezel portion 172 of the display module in such a manner that they are arranged to be spaced the predetermined distance relative to one another.

At this point, the infrared light emitting elements that are built into the bezel portion 172 refer to the IR LEDs.

In addition, at this point, the number of infrared light emitting elements that are built into the bezel portion 172 varies with the size of the display unit 170. For example, the larger the display unit 170, the larger the frame of the bezel 172. Thus, dead spots that are out of the light emitting range are created. Because of this, the number of built-in infrared light emitting elements that are built is large. Conversely, the smaller the display unit 170, the smaller the frame of the bezel portion 172. Thus, the number of portions in the light emitting ranges overlaps each other is increased. Because of this, the number of built-in infrared light emitting elements is small. In addition, the infrared light emitting elements that are built into the bezel portion 172 are arranged to be spaced the same distance relative to one another, but some of the infrared light emitting elements, can be arranged to be adjacent to one another, for example, in the vicinity of the capturing unit 190.

Figure 10A:
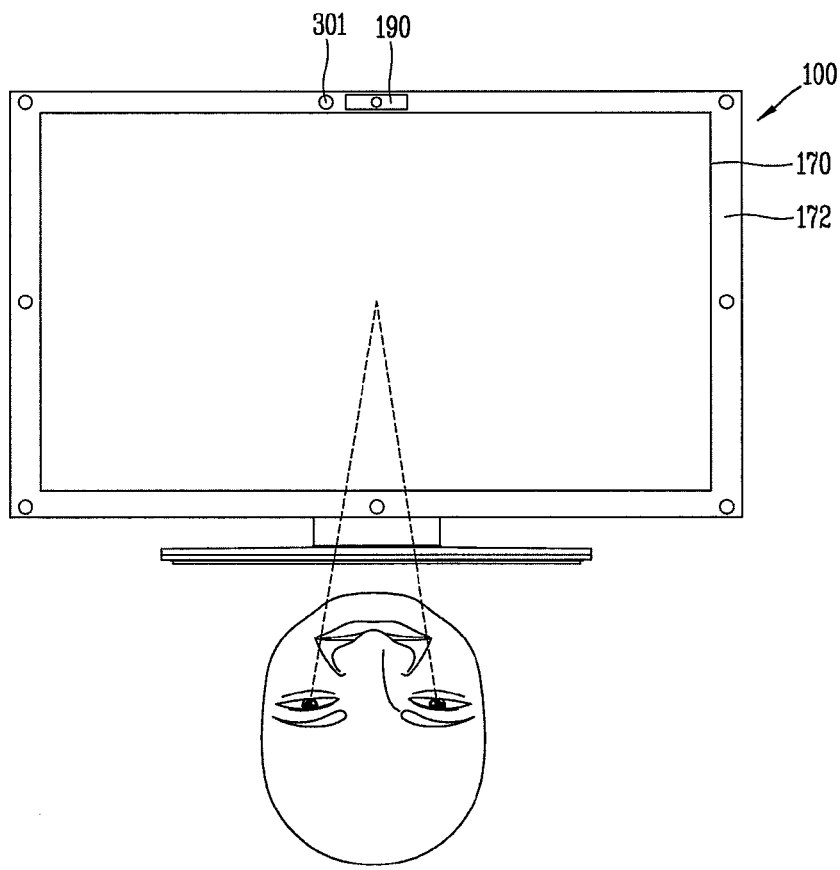
FIG. 10A is a diagram illustrating a schematic appearance.
Figure 10B:
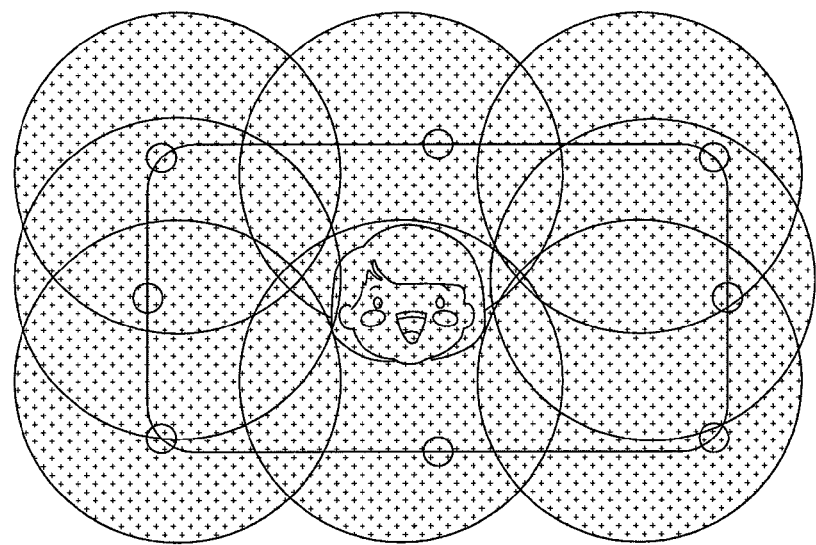
FIG. 10B is a diagram illustrating the light emitting ranges of the infrared LEDs according to the driving of the camera in the case wherein the user tracking function is performed in the image display apparatus.

For example, referring to FIGS. 10A and 10B, in the image display apparatus 100 according to the embodiment of the present invention, as illustrated in FIG. 10A, at least one infrared light camera 190 is mounted on or is built into the center of the upper end portion, and at least one infrared LED 301 adjacent to the infrared light camera 190 and the multiple infrared LEDs as necessary which are arranged to be spaced the predetermined distance relative to one another and away from the infrared light camera 190 are built along the edge of the bezel portion 172.

As a structural example, as illustrated in FIG. 10A, a total of eight infrared LEDs are built into the bezel portion 172: one for every corner and one for every one middle point between two corners. However, the number of infrared LEDs is not limited to eight, and the larger or smaller number of infrared LEDs can be built depending on the size of the display unit 170 or an environment in which the display unit 170 is used. Positional information on the built-in infrared LEDs is stored in advance in a memory 160. If the user tracking function is performed on the image display apparatus illustrated in FIG. 10A, emitting areas covered by the infrared LEDs according to the driving of the camera have not many overlapping portions as illustrated in FIG. 10B. Thus, the power consumption is reduced.

In addition, when the image display apparatus 100 with this structure enters the infrared photographing mode, the controller 150 of the image display apparatus 100 drives the capturing unit 190 and controls operation of the multiple infrared light emitting elements that is built into the bezel portion 172, based on a predetermined control signal.

Specifically, when the infrared photographing mode is entered, the controller 150 drives the capturing unit 190 and thus detects the position of the user who is present within the predetermined range from the display unit 170. When the user's position is detected in this manner, the controller 150 outputs the control signal for selectively operating the multiple infrared light emitting elements that are built into the bezel portion 172, based on the detected position of the user.

At this point, one or more photographing areas covered by the capturing unit 190 can be distinguished. In such a case, the controller 150 detects the photographing area corresponding to the user's position. For example, the photographing areas are grouped into four areas when viewed from in front of the display unit 170: a front area, a rear area, a left area, and a right area. In addition, the photographing areas further include positional information on an optimal area in which the change in the user's gaze is easy to detect, for example, an intermediate area in which front, rear, left, and right areas partly overlap one another.

When the photographing area corresponding to the user's position is detected in this manner, the controller 150 outputs the control signal for operating at least one infrared light emitting element of which the light emitting range has an effect on the detected photographing area.

To do this, the controller 150 determines the infrared light emitting element determines where the infrared light emitting element to be operated is positioned, based on positional information on the infrared light emitting element, which is stored in advance in the memory 160, and on information on the light emitting range (that is, coordinates of a border line of the light emitting range).

As described above, in the image display apparatus according to the embodiment of the present invention, the display module is realized as having the structure in which as many of the infrared LEDs as necessary are spaced a predetermined distance and are built into the bezel portion, in order to secure a viewing angle of the infrared light camera for the user tracking function. Furthermore, as many of the infrared LEDs as necessary are selectively made to emit light according to the position of the user who is present within the viewing angle range of the camera at the time of the drive of the infrared light camera. This provides an environment in which the power consumption due to the emitting of light by the infrared LEDs is minimized.

Referring to FIGS. 10A to 10B and FIGS. 14A to 14D, a method of operating the image display apparatus according to one embodiment of the present invention is described below. At this point, the structure assumes that the eight infrared light emitting elements are built into the bezel portion 172 (refer to FIG. 1) of the image display apparatus 100 (refer to FIG. 1) in such a manner that they are arranged to be spaced the predetermined distance relative to one another. The structure further assumes that the capturing unit 190 equipped with at least one image sensor is mounted, in the form of accessories, on the center of the upper end portion of the bezel portion 172, or is configured to be built into the bezel portion 172.

Figure 11:
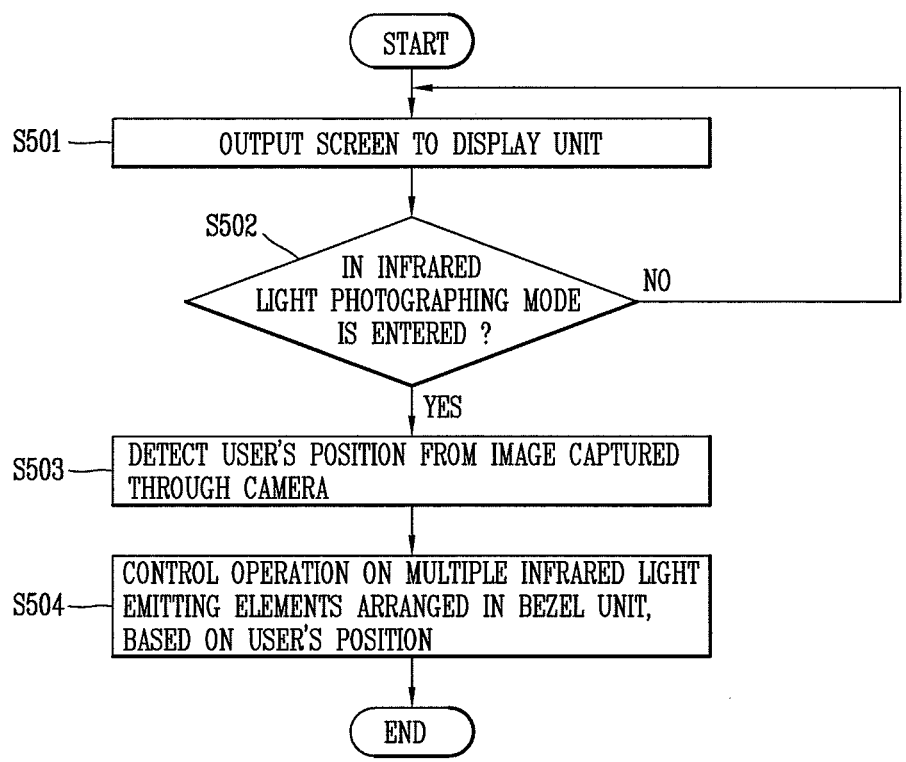
FIG. 11 is a flow chart for describing a method of operating an image display apparatus according to one embodiment of the present invention.

First, referring to FIG. 11, a screen is output to the display unit 170 (refer to FIG. 1) of the image display apparatus 100 (refer to FIG. 1) (S501).

At this point, there is no limit to a type of screen that is output to the display unit 170. For example, the screen is screen information on a specific broadcasting program, an execution screen, or a screen on which setting information for controlling a screen state is displayed.

In a state where predetermined screen information is output to the display unit 170 (refer to FIG. 1) in this manner, the controller 150 (refer to FIG. 1) detects whether or not the image display apparatus 100 enters the infrared photographing mode (S502).

At this point, the infrared photographing mode is a control mode for performing the user tracking function and is entered through a predetermined-type user input. For example, the user performs a push operation that pushes down a specific key, inputs a predetermined voice command, inputs a predetermined user gesture, or inputs a specific signal into the image display apparatus 100 through an external input device in order to enter the infrared light photographing mode for performing the user tracking function.

In addition, even though the infrared photographing mode is entered, the user tracking function is performed in the background, and thus the user has difficulty recognizing that the infrared photographing mode is entered and the user tracking function is performed. Therefore, when the infrared photographing mode is entered, the controller 150 outputs to one region of the display unit 170 a predetermined indicator (for example, text or an image) indicating that the infrared photographing mode is activated. In addition, when the photographing mode is changed from the infrared photographing mode to the ordinary mode, another indicator indicating this control mode change is output to the display unit 170.

In addition, the controller 150 performs an operation for calibration at least one time at the initial stage after the infrared photographing mode is entered. At this point, the calibration refers to an operation in which a distance between the capturing unit 190 and the user, a change in intensity of illumination, and the like are estimated and makes a preliminary adjustment to a focal distance diaphragm, a lens aperture scale and the like for the capturing unit 190, based on this estimation. The precision of the user tracking function is increased through the calibration. For example, the controller 150 display on the display the calibration that is in progress and outputs a predetermined pointer in such a manner as to help the user gaze at the pointer. When the user gazes at the pointer, the pointer is moved to another point on the display unit 170 in such a manner as to help the user gaze at the pointer in motion. When this process is repeatedly performed a given number of times, the calibration is completed.

Specifically, when the infrared photographing mode is entered, the controller 150 turns on all the infrared light emitting elements that are built into the bezel portion 172. Then, as described in more detail below, according to the user's position, the controller 150 performs the control in such a manner that at least one or more of the multiple infrared light emitting elements are maintained as being turned on or are turned off.

When the infrared photographing mode is entered in this manner, the controller 150 drives the capturing unit 190 and detects the user's position from images that are captured as the capturing unit 190, that is, the infrared light camera, is driven (S503).

Then, based on the detected position of the user, the controller 180 performs the control in such a manner that the multiple infrared light emitting elements that are arranged to be spaced the predetermined space relative to one another in the bezel portion 172 (refer to FIG. 1) selectively emit light (S504).

As one example, when the infrared light photographing mode is entered, the controller 150 outputs the control signal for enabling only the infrared light emitting element in a position corresponding to the detected position of the user to emit light.

Specifically, each of the multiple infrared light emitting elements that are arranged to be spaced relative to one another in the bezel portion 172 has a predetermined light emitting range with its built-in position in the center. That is, even though the light emitting ranges of the infrared light emitting elements may partly or wholly overlap one another, each infrared light emitting element has its own light emitting range. The user has to be present at least within the light emitting range of the infrared light emitting element. Therefore, it is desirable that the infrared light emitting element in the position corresponding to the detected position of the user refers to a specific infrared light emitting element of which the light emitting range is formed with the user-positioned point in the center or refers to the infrared light emitting elements adjacent to the specific infrared light emitting element.

In this context, FIGS. 14A to 14D are diagrams for describing the selective emitting of light by the infrared LED in the position corresponding to the detected position of the user in the image display apparatus according to one embodiment of the present invention. At this point, the photographing area covered by the capturing unit 190 is assumed to be divided into multiple areas when viewed from in front of the display unit 170. In addition, the number of infrared light emitting elements that are built into the bezel portion 172 is assumed to be eight: one for every corner and one for every one middle point between two corners.

Figure 14A:
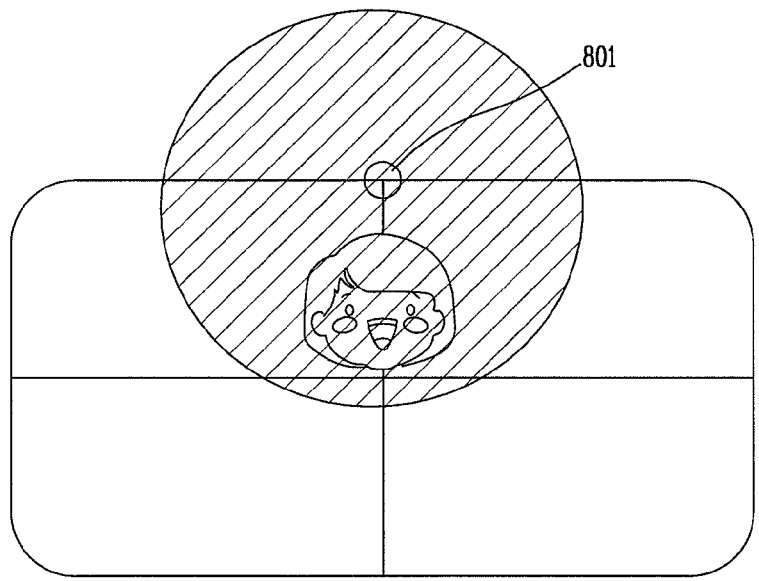
FIGS. 14A to 14D are diagrams for describing the selective emitting of light by the infrared LED in a position corresponding to a user's position in the graphic display apparatus according to one embodiment of the present invention.

As illustrated in FIG. 14A, if the user is positioned in front of the center of the display unit 170, an infrared light emitting element 801 positioned in a position that is nearest the user's position, that is, the infrared light emitting element 801 that is built into the center of the upper end portion of the bezel portion 172 is turned on.

Figure 14B:
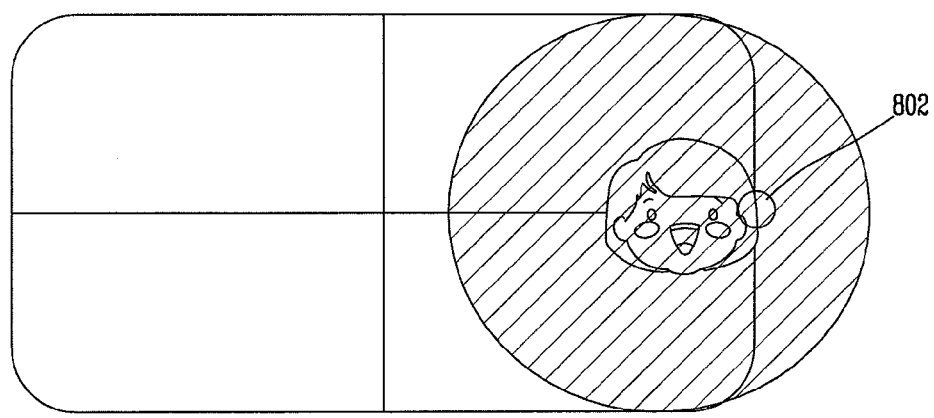
Figure 14C:
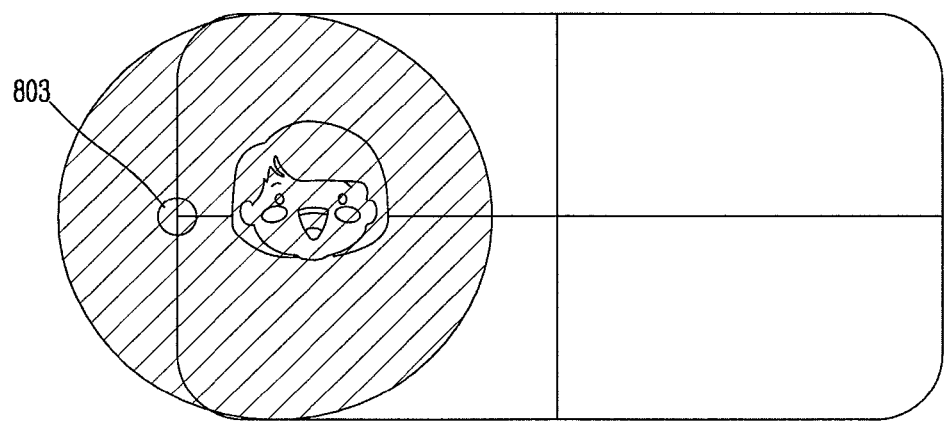

On the other hand, if the detected position of the user, as illustrated in FIG. 14B, is to the right when viewed from in front of the display unit 170, an infrared light emitting element 802 that is positioned nearest this position, that is, the infrared light emitting element 802 that is built into the center of the right end portion of the bezel portion 172 is turned on. Then, as illustrated in FIG. 14C, when the user's position is moved to the left when viewed from in front of the display unit 170, an infrared light emitting element 803 that is built into the center of the left end portion of the bezel portion 172 is turned on. At this point, the infrared light emitting elements 801 and 802 that are previously turned on is controlled in such a manner that they are turned off, and thus the power consumption due to the light-emitting is minimized.

Figure 14D:
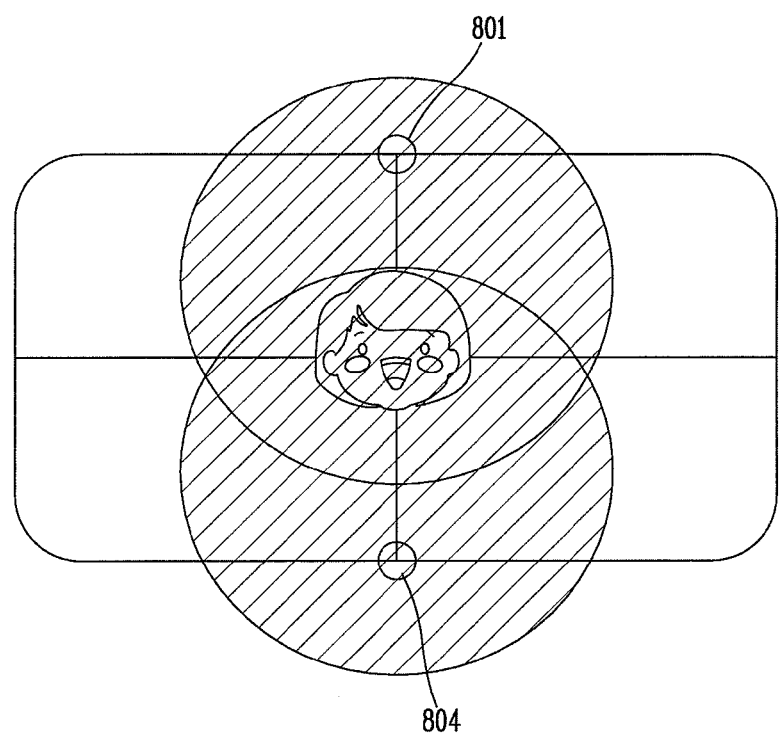

In addition, if the user is positioned in front of the center of the display unit 170 as illustrated in FIG. 14D, when only one infrared light emitting element is used, the light emitting range that has an effect on the user is narrow and thus the user tracking is limited. Therefore, at this point, the multiple infrared light emitting elements 801 and 804 that are similar in the light emitting range that has the effect on the user are turned on. In this case, among the eight infrared light emitting elements that are built into the bezel portion 172, only the two infrared light emitting elements emit light and thus the power consumption due to the light-emitting is largely reduced.

In addition, based on the user input, the controller 150 performs the control in such a manner that among the multiple infrared light emitting elements, an indicator that visually indicates a position of the infrared light emitting element in operation is displayed on one region of the display unit 170. For example, if the user inputs a voice signal, "Display an LED position," the controller 150 recognizes this voice and displays the indicator (for example, a thumbnail image) indicating the positions of the multiple infrared light elements that are built into the bezel portion 172 and whether or not the multiple infrared light elements are in operation. When this is done, an advantage is obtained in which the user can recognize malfunctions of the built-in multiple infrared light emitting elements or whether or not the built-in multiple infrared light emitting elements are in trouble (malfunctions).

On the other hand, if the user's position is not recognized for a predetermined time (for example, one minute), or if the user is recognized as being positioned out of the predetermined range from the display unit 170, the controller 150 inactivates the user tracking function and automatically terminates the infrared photographing mode.

A method of operating the image display apparatus according to another embodiment of the present invention is described below referring to FIG. 12 and FIGS. 13A to 13D. At this point, the structure assumes that the eight infrared light emitting elements are built into the bezel portion 172 (refer to FIG. 1) of the image display apparatus 100 (refer to FIG. 1) in such a manner that they are arranged to be spaced the predetermined distance relative to one another. The structure further assumes that the capturing unit 190 equipped with at least one image sensor is mounted, in the form of accessories, on the center of the upper end portion of the bezel portion 172, or is configured to be built into the bezel portion 172. In addition, the photographing area covered by the capturing unit 190 is assumed to be divided into multiple areas when viewed from in front of the display unit 170.

Figure 12:
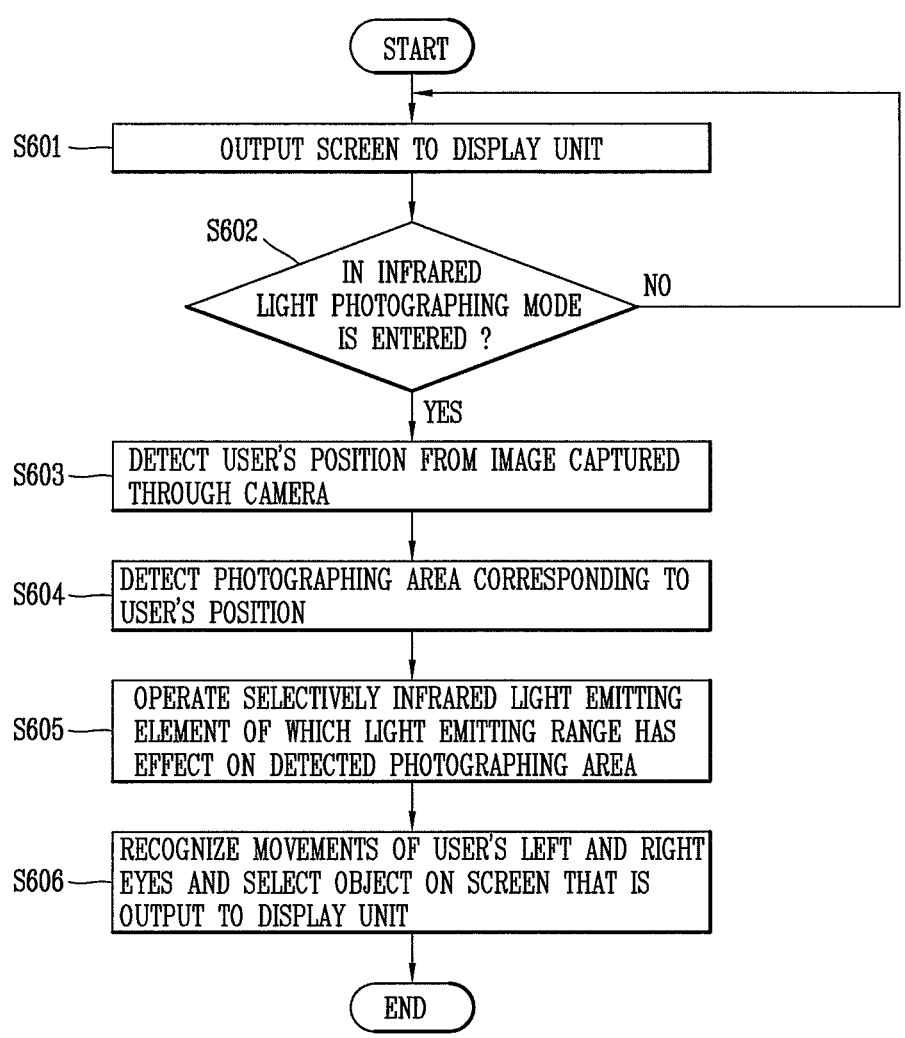
FIG. 12 is a flow chart for describing a method of operating an image display apparatus according to another embodiment of the present invention.

First, referring to FIG. 12, a predetermined screen is output to the display unit 170 (refer to FIG. 1) of the image display apparatus 100 (refer to FIG. 1) (S601). At this point, there is no limit to a type of screen that is output to the display unit 170.

In a state where predetermined screen information is output to the display unit 170 (refer to FIG. 1) in this manner, the controller 150 (refer to FIG. 1) detects whether or not the image display apparatus 100 enters the infrared photographing mode (S602). The infrared photographing mode is entered through various types of user inputs as described above. In addition, a setting can be provided in such a manner that when a specific application is executed, the infrared photographing mode is automatically entered without the user input. For example, when a web application is executed on the image display apparatus 100 and a specific web page screen is output to the display unit 170, the infrared photographing mode can be automatically entered and the user tracking function can be performed in the background.

When the infrared photographing mode is entered in this manner, the controller 150 drives the capturing unit 190 and detects the user's position from images that are captured as the capturing unit 190, that is, the infrared light camera, is driven (S603). To do this, the controller 150 performs signal processing on an image that is transferred from the capturing unit 190 and calculates the user's position as a predetermined coordinate value, for example, an X, Y, and Y coordinate value.

In addition, the controller 150 detects the photographing area corresponding to the detected position of the user (S604). Specifically, when the infrared photographing mode is entered, the controller 150 detects the photographing area corresponding to the position of the user who is detected as being present within the predetermined range from the display unit 170.

To do this, the photographing area corresponding to the viewing angle range covered by the capturing unit 190 is divided into multiple areas. For example, the photographing area is divided into four photographing areas: a front area, a rear area, a left area, and a right area when viewed from in front of the display unit 170. Alternatively, the photographing area is divided into four photographing areas: a front and left area, a front and right area, a rear and left area, and a rear and right area when viewed from in front of the display unit 170. The number of areas that results from dividing the photographing area and a standard for dividing the photographing are changed by the user input.

Based on the calculated coordinate value and positional information on predetermined photographing areas that result from the division, the controller 150 determines a position of the photographing area in which the user is currently positioned. The positional information on the photographing areas that result from the division and range information are stored, in advance, in the memory 160. In addition, the positional information on the photographing areas that result from the division and the range information that are stored in advance are changed through the user input. Alternatively, a setting is provided in such a manner that the positional information on the photographing areas that result from the division and the range information vary when the user tracking function is activated with respect to the multiple users.

In addition, the user's position is changed and the photographing area is accordingly changed, the controller 150 displays a screen change corresponding to the changed photographing area.

For example, when the photographing area in which the user is positioned is changed from a first area to the second area, the controller 150 performs the control in such a manner that the screen change corresponding to the changed photographing area is displayed on one region of the display unit 170. To do this, the controller 170 displays on one region of the display unit 170 an indicator indicating the multiple photographing areas that result from the division and indicating the photographing area, among the multiple photographing areas, in which the user is positioned. In addition, according to an environment, a pop-up window or a signal (for example, a voice signal, a haptic signal, or a highlighting effect on a screen) is output in such a manner as to help the user move to within a specific photographing area.

Furthermore, if the detected position of the user is out of the multiple photographing areas, that is, is out of the viewing angle of the capturing unit 190, the controller 150 outputs a predetermined alarm in such a manner as to help the user move to within the viewing angle. A format of the alarm is not given any limit, and a predetermined voice signal, the outputting of the pop-up window to the screen, and the like are all possible.

When the photographing area corresponding to the user's position is determined in this manner, the controller 150 generates a control signal for selectively operating the infrared light emitting element of which the light emitting range has an effect on the detected photographing area (S605).

In this context, FIGS. 13A to 13D are diagrams for describing the selective emitting of light by the infrared light emitting element, which has an effect on the photographing area in which the user is positioned, in the image display apparatus according to one embodiment of the present invention. First, the photographing area is divided into four areas when viewed from in front of the display unit 170: a front and left area, a front and right area, a rear and left area, and a rear and right area.

Figure 13A:
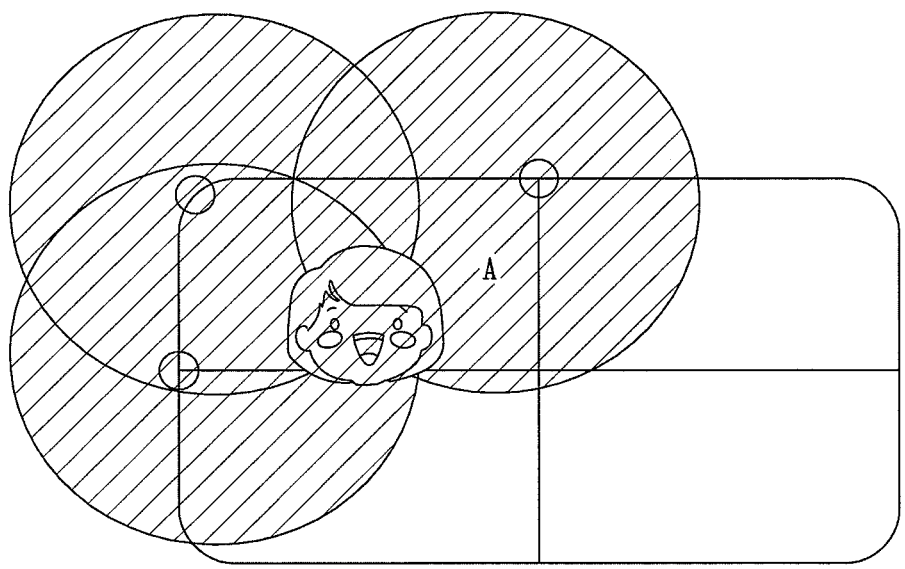
FIGS. 13A to 13D are diagrams for describing the selective emitting of light by the infrared light emitting element, which has an effect on a photographing area in which the user is positioned, in the graphic display apparatus according to one embodiment of the present invention.

Referring to FIG. 13A, if the user's position is within a front and left photographing area A, among the multiple infrared light emitting elements, LEDs that are positioned in the center and the upper left end portion are turned on and thus tracks the user (or the pupils of the user's left and right eyes of the user) as the capturing unit 190 is driven. At this point, as an example, among the eight infrared light emitting elements, the three infrared light emitting elements of which the light emitting ranges mainly covering the photographing area A operates, but the present invention is not limited to the example. All the infrared light emitting elements that are built into the left end portion of the bezel portion 172 can be realized as operating or only one infrared light emitting element that covers the entire photographing area A can be realized as operating.

Figure 13B:
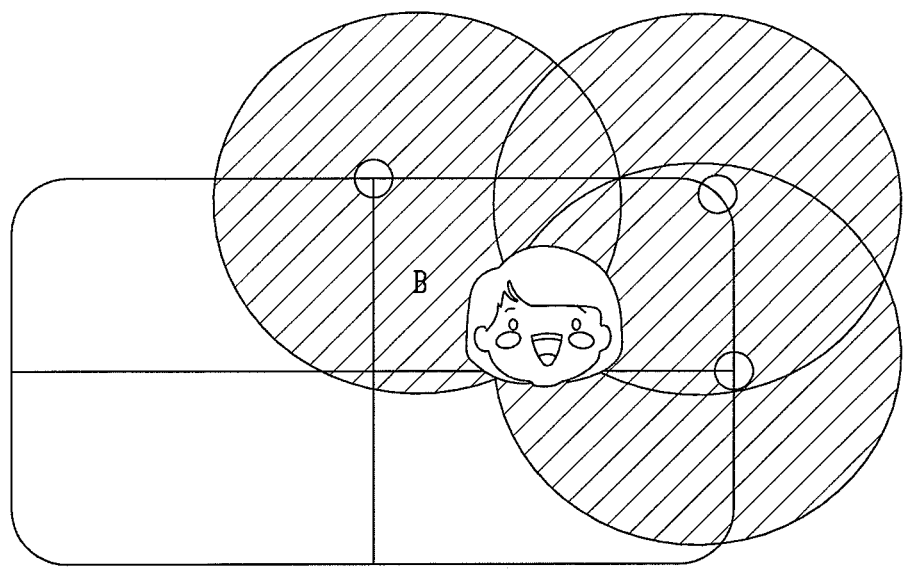
Figure 13C:
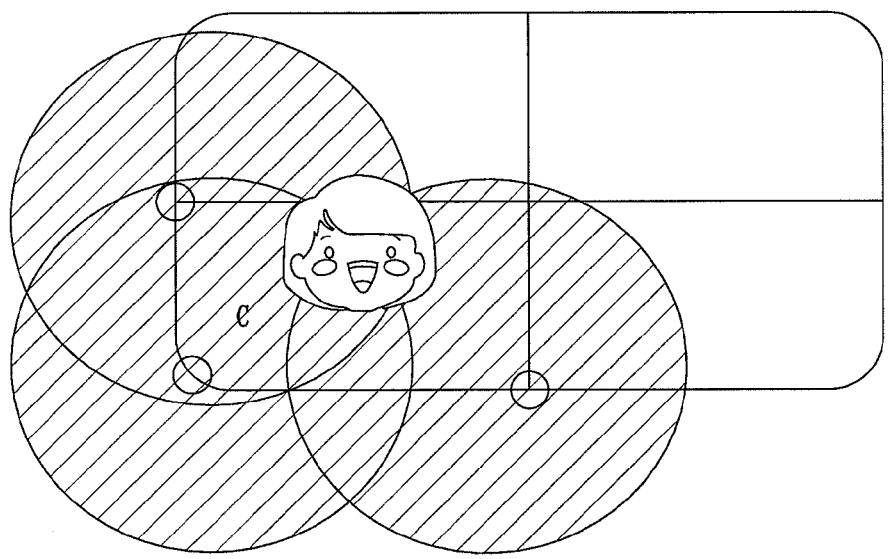
Figure 13D:
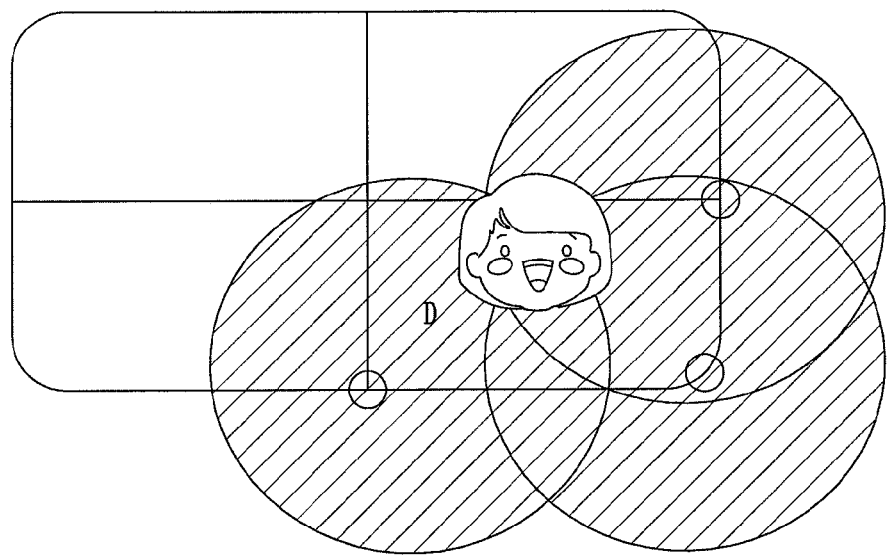

In addition, it is apparent from FIG. 13B to 13D that if the user's position is within a front and right photographing area B, a rear and left photographing area C, or a rear and right photographing area D, the infrared light emitting elements, the light emitting range of each mainly covers the corresponding photographing area B, C, or D, are turned on and thus the user (the pupils of the user's left and right eyes) is tracked as the capturing unit 190 is driven.

In this manner, when the multiple infrared light emitting elements that are built into the bezel portion 172 selectively emit light as the capturing unit 190 is driven, the controller 150 recognizes the movements of the left and right eyes of the user who is present within the predetermined range from the display unit 170. Then, the controller 150 performs the control in such a manner that the an object on the screen that is output to the display unit 170, based on the movements of the user's left and right eyes.

For example, the recognized eyes of the user gazes, for a predetermined time, at a specific object on the screen that is output, the corresponding object is selected, and a related function is performed according to a type of screen or a type of corresponding application. For example, in a case of an execution screen of a map application, when it is recognized that the eyes of the user gaze at a specific point for the predetermined time, the corresponding execution screen is enlarged with the specific point in the center.

Figure 15A:
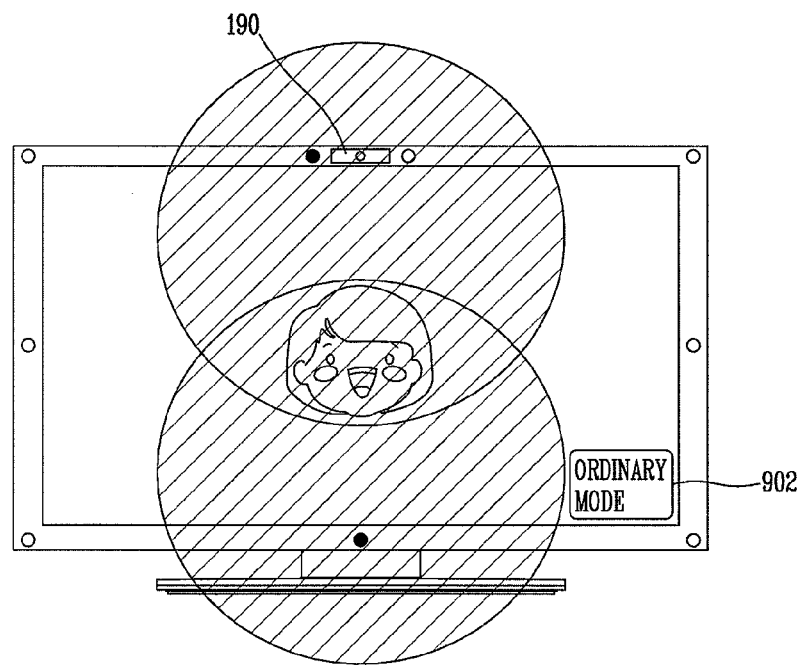
FIGS. 15A and 15B are diagrams for describing patterns of the infrared LEDs that differ according to an ambient state of intensity of illumination when the user tracking function is performed in the image display apparatus according to one embodiment of the present invention.
Figure 15B:
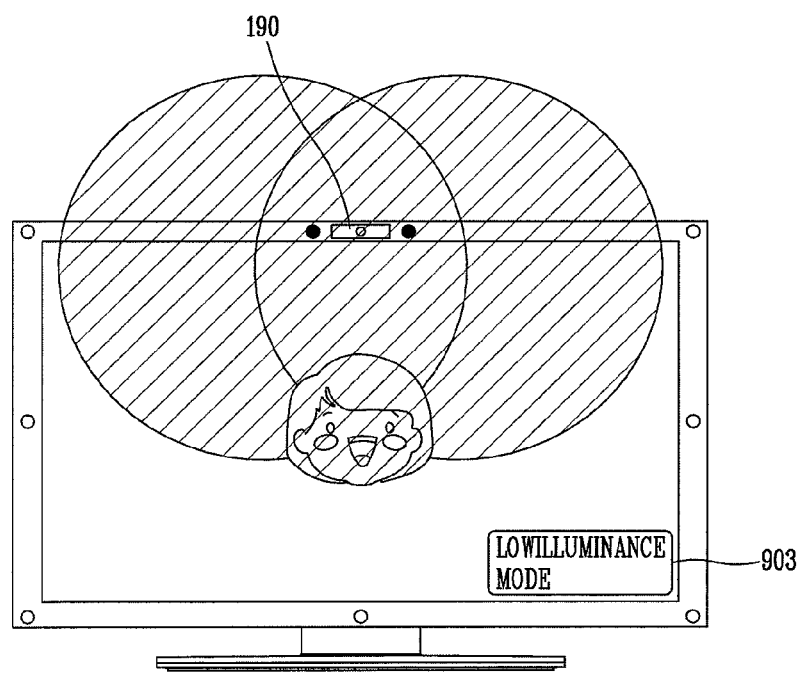

Control of the operation of the infrared LED is described below referring to FIGS. 15A and 15B, which differs according to the state of ambient intensity of illumination if the user tracking function is performed in the infrared photographing mode. To do this, the image display apparatus 100 according to the present invention includes a sensing unit 185. The sensing unit 185 may be a separate sensor or may be realized as a function including in the capturing unit 190.

At this point, the structure assumes that the nine infrared light emitting elements are built into the bezel portion 172 (refer to FIG. 1) of the image display apparatus 100 (refer to FIG. 1) in such a manner that they are arranged to be spaced the predetermined distance relative to one another. The structure further assumes that among the nine infrared light emitting elements, at least one pair of infrared light emitting elements is arranged to be adjacent to the capturing unit 190.

In addition, the structure assumes that the capturing unit 190 equipped with at least one image sensor is mounted, in the form of accessories, on the center of the upper end portion of the bezel portion 172.

The infrared light emitting elements that are arranged to be away from the capturing unit 190 selectively emit light using a method of recognizing the dark pupils of the user's left and right eyes, and the infrared light emitting elements that are arranged to be adjacent to the capturing unit 190 selectively emit light in a method of recognizing the bright pupils of the user's left and right eyes.

In the dark-pupil recognition method, IR light entering through the capturing unit 190 is not reflected directly from the pupils and thus the pupils appears dark. In the bright-pupil recognition method, IR light entering through the capturing unit 190 is reflected directly from the pupils and thus the pupils appear bright. The infrared light camera for tracking the user in the related art is configured to have a structure in which the multiple infrared light emitting elements are closely spaced in the vicinity of the camera, and thus uses the bright-pupil recognition method.

According to the present invention, most of the infrared light emitting elements are arranged to be away from the capturing unit 190 in order to use the dark-pupil recognition considering the viewing angle and the structure of the bezel portion (in which the infrared light emitting elements are easy to arrange to be away from the capturing unit 190). However, as described below, depending on environments (for example, the state of ambient intensity of illumination), there is a case where it is advantageous to operate the infrared light emitting elements using the bright-pupil recognition method. Thus, some of the infrared light emitting elements are structurally arranged to be adjacent to the capturing unit 190.

In a state where predetermined screen information is output to the display unit 170 (refer to FIG. 1), the controller 150 (refer to FIG. 1) detects whether or not the image display apparatus 100 enters the infrared photographing mode.

When the infrared photographing mode is entered in this manner, the controller 150 drives the capturing unit 190 and detects the user's position from images that are captured as the capturing unit 190, that is, the infrared light camera, is driven. Then, based on the detected position of the user, the controller 180 performs the control in such a manner that the multiple infrared light emitting elements that are arranged to be spaced the predetermined space relative to one another in the bezel portion 172 (refer to FIG. 1) selectively emit light.

In the infrared light photographing mode, the capturing unit 190 emits infrared (Ir) light to the user's left and right eyes, and the capturing unit 190 recognizes an image reflected from the user's left and right eyes. Accordingly, the controller 150 detects, for example, that the user's gaze is fixed on a specific object on the screen that is output to the display unit 170.

When the infrared photographing mode is activated, the controller 150 receives information on the ambient intensity of illumination from the sensing unit 185 and performs the control such a manner that the multiple infrared light emitting elements emit light in different patterns according to the detected state of intensity of illumination. For example, when the detected intensity of illumination is at a threshold value (a minimum value for determining the state of low intensity of illumination) or less, the infrared light emitting elements selectively emit light in a first pattern. When the detected intensity of illumination is above the threshold value, the infrared light emitting elements selectively emit light in a second pattern.

To do this, as described above, the multiple infrared light emitting elements (at least a pair of infrared light emitting elements) adjacent to the capturing unit 190 and the multiple infrared light emitting elements that are away from the capturing unit 190 are built into the bezel 172 of the display module.

Specifically, when the detected state of intensity of illumination is a first state (for example, an ordinary state), the controller 150 performs the control in such a manner that the multiple infrared light emitting elements that are away from the capturing unit 190 emit light corresponding to the detected position of the user. In contrast, when the detected state of intensity of illumination is a second state (for example, low intensity of illumination), the controller 150 performs the control in such a manner that the multiple infrared light emitting elements that are positioned to be adjacent to the capturing unit 190 emit light corresponding to the detected position of the user.

At this point, the first state refers to a state of high intensity of illumination or an ordinary state and the second state refers to a state of low intensity of illumination.

At this point, the low illumination state refers to a state where the movements of the pupils are difficult to track using the dark-pupil recognition method because average brightness of a captured image of a photographic subject does not exceed a predetermined reference value although IRIS opening of the camera (an amount of light that enters through the lens) is increased and an analog gain value is increased. Therefore, in such a case, the infrared light emitting elements that are arranged to be adjacent to the capturing unit 190 are operated in order to track the movements of the pupils using the bright-pupil recognition method.

In addition, when it is detected that the state of intensity of illumination is changed from the first state to the second state or from the second state to the first state, the controller 150 outputs one region of the display unit 170 an indicator for giving notice of the detected state of intensity of illumination, such as an alarm. However, the alarm is realized in the form of sound, vibration, or a highlighting effect.

The infrared light emitting elements emit light in this manner by exceptionally using the bright-pupil recognition method in the related art in the state of low intensity of illumination, and thus precision of the user tracking function is increased. On the other hand, the bright-pupil recognition method is not only used in the state of low intensity of illumination, but is selectively used also by a user's setting or according to a change in an environment value or the user's position.

As described above, in the image display apparatus according to the present invention and the method of operating the image display apparatus, if the video telephone call function or the user tracking function is performed, the control is performed in such a manner that the image capturing suitable for each function is performed, particularly using one image sensor. Thus, it is unnecessary to include the multiple cameras and the resulting additional cost is not incurred. In addition, the structure of the image display apparatus equipped with various functions is made simple. When the user tracking function is performed, as many of the infrared LEDs as necessary are spaced a predetermined space relative to one another and are built into the bezel portion in order to cover the viewing angle of the camera. Thus, the user tracking function is performed only with the small number of infrared LEDs. This reduces the manufacturing cost. In addition, when the user tracking function is performed, as many of the infrared LEDs as necessary selectively emits light according to the user's position within the viewing angle of the camera. Thus, the power consumption due to the emitting of light by the infrared LEDs is minimized.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An image display apparatus comprising:
a main body;
a display unit configured to display at least one screen image;
a capturing unit mounted on the main body and configured to capture at least one image using a single image sensor;
a drive unit configured to receive a control signal for selectively activating any one of an ordinary photographing mode and an infrared light photographing mode that differ depending on whether or not to use an infrared light-cut filter, in order to drive the capturing unit; and
a controller configured to:
output a first control signal for establishing a connection between the single image sensor and the infrared light-cut filter when one screen image for capturing an image corresponding to the ordinary photographing mode is displayed on the display unit, and
output a second control signal for establishing a connection between the single image sensor and a visible light-cut filter when another screen image for capturing an image corresponding to the infrared light photographing mode is displayed to the display unit,
wherein the controller is further configured to:
detect a user's gaze when the one screen image corresponding to the ordinary photographing mode and the another screen image corresponding to the infrared light photographing mode are displayed on a first region and a second region of the display unit, respectively,
output the first control signal for establishing a connection between the single image sensor and the infrared light-cut filter when the user's gaze detected through the capturing unit is fixed on the first region of the display unit for a predetermined time, and
output the second control signal for establishing a connection between the single image sensor and the visible light-cut filter when the user's gaze detected through the capturing unit is fixed on the second region of the display unit for the predetermined time.

2. The image display apparatus according to claim 1, wherein the ordinary photographing mode is a mode for an ordinary photographing or a video telephone call, and
wherein the infrared light photographing mode is a mode for obtaining information on a user's gaze.

3. The image display apparatus according to claim 2, wherein the controller is further configured to control the display unit to output at least one indicator which corresponds to each of control signals that are output according to a change from the ordinary photographing mode to the infrared light photographing mode and a change from the infrared light photographing mode to the ordinary photographing mode, respectively.

4. The image display apparatus according to claim 1, wherein, when the first control signal is received, the drive unit drives the capturing unit so that the infrared light-cut filter is slid to be positioned in front of the single image sensor, and
wherein, when the second control signal is received, the drive unit drives the capturing unit so that the visible light-cut filter is slid to be positioned in front of the single image sensor.

5. The image display apparatus according to claim 1, further comprising:
at least one switch configured to perform an on/off operation on the infrared light-cut filter and the visible light-cut filter according to the control signal,
wherein the drive unit is further configured to operate a switching element provided in the switch according to the control signal that is received, in order to selectively perform any one of the ordinary photographing mode and the infrared light photographing mode.

6. The image display apparatus according to claim 1, wherein the capturing unit is further configured to detect ambient intensity of illumination, and
wherein, when it is determined that the ambient intensity of illumination detected through the capturing unit is low intensity of illumination in a state where the one screen image for capturing the image corresponding to the ordinary photographing mode is output to the display unit, the controller outputs the second control signal to the drive unit.

7. The image display apparatus according to claim 1, wherein, when it is determined that a user's position is out of a predetermined range from the display unit for a predetermined time in a state where the another screen image for capturing the image corresponding to the infrared light photographing mode is output to the display unit, the controller outputs the first control signal to the drive unit.

8. The image display apparatus according to claim 1, wherein the infrared light-cut filter and the visible light-cut filter are arranged to be sideways together in one direction and away from the single image sensor or are arranged to be sideways in opposite directions, respectively, and away from the single image sensor, and
wherein the drive unit is further configured to drive a photographing in such a manner that one, which corresponds to the received control signal, of the infrared light-cut filter and the visible light-cut filter, is connected to be positioned in front of the single image sensor.

* * * * *